US009117067B2

(12) United States Patent
Ota et al.

(10) Patent No.: US 9,117,067 B2
(45) Date of Patent: Aug. 25, 2015

(54) MOBILE INFORMATION TERMINAL AND GRIPPING-FEATURE LEARNING METHOD

(75) Inventors: Manabu Ota, Chiyoda-ku (JP); Masakatsu Tsukamoto, Chiyoda-ku (JP); Yasuo Morinaga, Chiyoda-ku (JP); Takeshi Higuchi, Chiyoda-ku (JP)

(73) Assignee: NTT DOCOMO, INC, Tokyo (JP)

( * ) Notice: Subject to any disclaimer, the term of this patent is extended or adjusted under 35 U.S.C. 154(b) by 21 days.

(21) Appl. No.: 13/976,482
(22) PCT Filed: Jan. 27, 2012
(86) PCT No.: PCT/JP2012/051752
§ 371 (c)(1),
(2), (4) Date: Jun. 27, 2013
(87) PCT Pub. No.: WO2012/102365
PCT Pub. Date: Aug. 2, 2012

(65) Prior Publication Data
US 2013/0298225 A1 Nov. 7, 2013

(30) Foreign Application Priority Data
Jan. 28, 2011 (JP) .................................. 2011-016096

(51) Int. Cl.
G06F 21/32 (2013.01)
H04W 12/06 (2009.01)
H04M 1/725 (2006.01)
H04W 88/02 (2009.01)

(52) U.S. Cl.
CPC ............... *G06F 21/32* (2013.01); *H04W 12/06* (2013.01); *H04M 1/72522* (2013.01); *H04W 88/02* (2013.01)

(58) Field of Classification Search
CPC .......................... G06F 21/32; H04L 29/06809
See application file for complete search history.

(56) References Cited

U.S. PATENT DOCUMENTS

2002/0111198 A1* 8/2002 Heie .............................. 455/574
2005/0273333 A1* 12/2005 Morin et al. .................. 704/247
2009/0265344 A1* 10/2009 Etoh et al. ......................... 707/5
2011/0056108 A1* 3/2011 McCord et al. ............. 42/70.01

FOREIGN PATENT DOCUMENTS

JP 2001 142849 5/2001
WO WO 2009/025910 A2 2/2009

OTHER PUBLICATIONS

International Search Report Issued Apr. 17, 2012 in PCT/JP12/051752 Filed Jan. 27, 2012.
Extended European Search Report issued May 27, 2014 in Patent Application No. 12739959.0.
Kee-Eung Kim et al., "Hand Grip Pattern Recognition for Mobile User Interfaces", Proceedings Twenty-first National Conference on Artificial Intelligence (AAAI-06). Eighteenth Innovative Applications of Artificial Intelligence Conference, No. 18, XP-002718299, Jan. 1, 2007, pp. 1789-1794.
Chinese Office Action issued May 15, 2015 for Patent Application No. 201280006605.0 with English translation.

* cited by examiner

*Primary Examiner* — Gilberto Barron, Jr.
*Assistant Examiner* — Arya Golriz
(74) *Attorney, Agent, or Firm* — Oblon, McClelland, Maier & Neustadt, L.L.P.

(57) ABSTRACT

A mobile information terminal includes a mode acquisition section adapted to acquire the mode of the mobile information terminal; a sample filling section adapted to, when the number of gripping feature samples acquired in a mode is insufficient, fill in lacking gripping feature samples with gripping feature samples acquired in another mode; a gripping-feature sample acquisition section adapted to acquire gripping feature samples; a switch adapted to switch the mobile information terminal between a learning state and an authentication state; a template learning section adapted to learn an authentication template in each mode using the gripping feature samples when the mobile information terminal is in the learning state; an authentication section adapted to compare the learned authentication template with gripping feature samples in each mode to perform authentication; and a locking section adapted to lock some or all of functions of the mobile information terminal when the authentication fails.

11 Claims, 19 Drawing Sheets

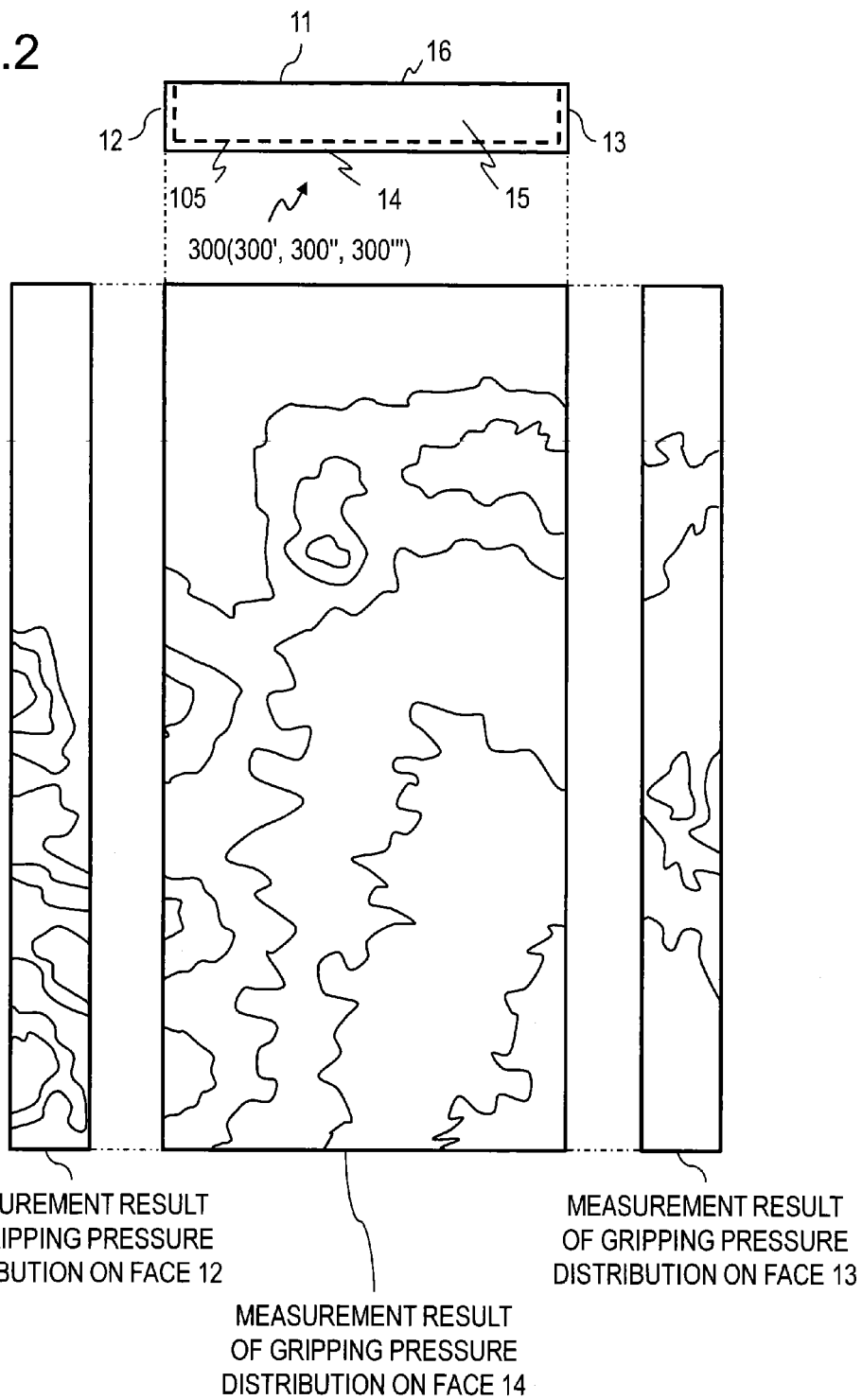

FIG.14

| NUMBER | MODE NAME | TERMINAL STATE | MODE CATEGORY |
|---|---|---|---|
| 1 | BROWSER 1 | COMMUNICATION FEE IS BEING CHARGED IN BROWSING OR OTHER CASES | A |
| 2 | BROWSER 2 | IT IS HIGHLY POSSIBLE THAT CONTENT FEE OR OTHER FEES ARE CHARGED | A |
| 3 | EMAIL | PERSONAL INFORMATION MAY BE BROWSED | B |
| 4 | PERSONAL INFORMATION BROWSING | BEING BROWSING PERSONAL INFORMATION SUCH AS THAT IN ADDRESS BOOK | C |
| 5 | MAKING CALLS | COMMUNICATION FEE IS BEING CHARGED | D |
| 6 | APPLICATION | COMMUNICATION FEE IS BEING CHARGED, AND PERSONAL INFORMATION MAY BE BROWSED | B |
| 7 | MENU | PERSONAL INFORMATION MAY BE BROWSED | C |
| ... | ... | ... | ... |

FIG.15

| NUMBER | MODE NAME | EXPRESSIONS SHOWING CORRELATION BETWEEN MODES (P FILLING SAMPLES ARE ACQUIRED) |
|---|---|---|
| 1 | BROWSER 1 | MODE 2:P*0.8<br>MODE 3:P*0.2 |
| 2 | BROWSER 2 | MODE 1:P*0.8<br>MODE 3:P*0.2 |
| 3 | EMAIL | MODE 6:P*0.8<br>MODE 1:P*0.2 |
| 4 | PERSONAL INFORMATION BROWSING | MODE 7:P*0.8<br>MODE 3:P*0.2 |
| 5 | MAKING CALLS | — |
| 6 | APPLICATION | MODE 3:P*0.8<br>MODE 1:P*0.2 |
| 7 | MENU | MODE 4:P*0.8<br>MODE 3:P*0.2 |
| ... | ... | ... |

FIG.16

| NUMBER | MODE NAME | EXPRESSIONS SHOWING CORRELATION BETWEEN MODES (P FILLING SAMPLES ARE NOT ACQUIRED) |
|---|---|---|
| 1 | BROWSER 1 | MODE 2:Q2<br>MODE 3:Q2*(1/4) (or Q3) |
| 2 | BROWSER 2 | MODE 1:Q1<br>MODE 3:Q1*(1/4) (or Q3) |
| 3 | EMAIL | MODE 6:Q6<br>MODE 1:Q6*(1/4) (or Q1) |
| 4 | PERSONAL INFORMATION BROWSING | MODE 7:Q7<br>MODE 3:Q7*(1/4) (or Q3) |
| 5 | MAKING CALLS | — |
| 6 | APPLICATION | MODE 3:Q3<br>MODE 1:Q3*(1/4) (or Q1) |
| 7 | MENU | MODE 4:Q4<br>MODE 3:Q4*(1/4) (or Q3) |
| ... | ... | ... |

FIG.19

| NUMBER | MODE NAME | SAMPLING TRIGGER | OTHER-PERSON DETERMINATION LINE |
|---|---|---|---|
| 1 | BROWSER 1 | BROWSER IN OPERATION ∩ PRESSING OK KEY | 50 |
| 2 | BROWSER 2 | BROWSER IN OPERATION ∩ PRESSING OK KEY | 40 |
| 3 | EMAIL | MAILER IN OPERATION ∩ PRESSING OK KEY | 40 |
| 4 | PERSONAL INFORMATION BROWSING | PERSONAL INFORMATION BEING DISPLAYED ∩ PRESSING OK KEY | 40 |
| 5 | MAKING CALLS | ONCE EVERY FIVE MINUTES | 50 |
| 6 | APPLICATION | ONCE EVERY FIVE MINUTES | 60 |
| 7 | MENU | MENU SCREEN BEING DISPLAYED ∩ PRESSING OK KEY | 60 |
| ... | ... | ... | ... |

MOBILE INFORMATION TERMINAL AND GRIPPING-FEATURE LEARNING METHOD

TECHNICAL FIELD

The present invention relates to a mobile information terminal and a gripping-feature learning method that acquire a gripping feature sample when the mobile information terminal is gripped and perform authentication.

BACKGROUND ART

Recently, various types of financial services, such as electronic money, have become more widespread as mobile information terminals have gained higher functionality. In addition, as mobile information terminals have gained higher functionality, the terminals have been used to store many pieces of private information, such as addresses, emails, photos, and website browsing history. Conventionally, security has been maintained for information handled with mobile information terminals by authentication (hereafter called log-in authentication) performed when starting to use the mobile information terminals. In log-in authentication, however, after authentication is performed at the start of use, whether the user is the person who authenticated is not continuously monitored. Therefore, if the mobile information terminal is used by another person for some reason after log-in authentication, the other person can operate the mobile information terminal without performing log-in authentication. Such a security vulnerability in log-in authentication has been a problem. To solve this problem, Patent Literature 1 discloses a portable information terminal in which the positions where the user using the terminal grips the terminal when performing authentication are acquired by a plurality of pressure sensors and recorded; if, after authentication, the positions where the user grips the terminal are changed by a specified distance or more, the required data input by the user to use a service is invalidated and the validity of the authentication already performed is cancelled. Therefore, even if the terminal is stolen during the act of inputting data required to use a service after authentication, the authentication and the data input by the user are invalidated when the user's hand is separated from the terminal. To use a service after the authentication is invalidated it is necessary to perform authentication again. Therefore, this terminal can effectively prevent unauthorized use by a third party.

CITATION LIST

Patent Literature

Patent literature 1: Japanese Patent Application Laid Open No. 2001-142849

DISCLOSURE OF THE INVENTION

Problems to be Solved by the Invention

The user of a portable information terminal grips the terminal quite differently, depending on the situation of use. For example, when the user activates a game application to play a game, when the user is about to send an email that he or she composed, and when the user is making a phone call, the user may grip the terminal quite differently depending on the situation of use of the terminal. Patent Literature 1 assumes that authentication is performed with the use of gripping features when the user uses a portable information terminal to use a service, but does not expect that authentication can be performed with the use of gripping features in any situation of use. Therefore, with the portable information terminal disclosed in Patent Literature 1, authentication cannot be performed in various situations of use with the use of gripping features. One possible way to solve this problem is authentication in various modes. The situations of use of the portable information terminal are classified into several modes. The modes include, for example, an email mode, an application mode, and a browser mode. The modes are specified according to the activation states of applications built into the terminal. Between a camera mode and the email mode, for example, the terminal is gripped quite differently. It is assumed here that gripping features are not necessarily similar between modes. It is also assumed, however, that the gripping features in one particular mode are similar. For example, gripping features acquired when an email is written and those acquired when an email is sent or received, in the email mode, have small differences but are similar. As described above, several modes are defined for the portable information terminal such that the gripping features are consistently the same in each mode, and an authentication template necessary for authentication is learned for each mode. When authentication is performed such that a gripping feature sample (for example, a set of detection outputs from a plurality of pressure sensor devices) is acquired at predetermined timing (for example, at the moment when a designated operating key is pressed) and the sample is verified with the authentication template of the user in each mode, authentication can be performed in various situations of use, and the foregoing problem is solved.

If a gripping feature sample is acquired in each mode and the authentication template is learned in each mode, however, it is necessary to have quite a large number of gripping feature samples in each mode in order to obtain a precise authentication template. To acquire quite a large number of gripping feature samples, a learning period can be specified. In the learning period, however, the user may use one mode frequently but another mode infrequently. The number of acquired gripping feature samples may be uneven among the modes. In that case, the authentication template has sufficient precision for one mode but insufficient precision for another mode. Therefore, authentication having sufficient precision cannot be performed with a short learning period. An object of the present invention is to provide a mobile information terminal capable of learning an authentication template having high precision for each situation of use (mode) in a short learning period even when authentication is performed with gripping features in various situations of use (modes).

Means to Solve the Problems

A mobile information terminal of the present invention includes a mode acquisition section, a gripping-feature sample acquisition section, a switch, a sample filling section, a template learning section, an authentication section, and a locking section. The mode acquisition section acquires the mode of the mobile information terminal. The gripping-feature sample acquisition section acquires gripping feature samples. The switch switches the terminal between a learning state and an authentication state. If the terminal is in the learning state and the number of acquired gripping feature samples is insufficient in one mode, the sample filling section fills in the lacking gripping feature samples in that mode by using acquired gripping feature samples acquired in another mode. The template learning section learns an authentication template in each mode by using the gripping feature samples acquired by the gripping-feature sample acquisition section, when the terminal is in the learning state. The authentication section compares the learned authentication template with gripping feature samples to perform authentication when the terminal is in the authentication state. The locking section locks some or all of the functions of the terminal if authentication fails.

Effects of the Invention

According to a mobile information terminal of the present invention, a highly precise authentication template can be learned in each situation of use (mode) in a short learning period even when authentication is performed by using gripping features in various situations of use (modes).

BRIEF DESCRIPTION OF THE DRAWINGS

FIG. 2 is an example view showing gripping pressure distributions output from a pressure sensor array built in the portable terminal, which is related to all the embodiments;

FIG. 14 is a view illustrating mode classification performed according to similarity in gripping features;

FIG. 15 is a view illustrating the filling rates of gripping feature samples, according to similarity in gripping features;

FIG. 16 is a view illustrating the filling rates of gripping feature samples, according to similarity in gripping features;

FIG. 19 is a view illustrating examples of modes, sampling triggers in the modes, and other-person determination lines.

BEST MODES FOR CARRYING OUT THE INVENTION

Now, embodiments of the present invention will be described in detail. Components having the same functions are assigned the same numbers, and a description thereof will given just once.

Example devices made by embodying a mobile information terminal of the present invention include portable terminals, PDAs, portable game machines, electronic pocketbooks, and electronic book readers. In addition to these listed devices, any devices that satisfy the following three requirements can be a mobile information terminal of the present invention. (1) Being used while being gripped, and being able to acquire gripping features; (2) having different usage modes and having a stable gripping state in each mode; and (3) having the risk of leaking personal information and valuable information by way of loss or theft. In the following descriptions of embodiments, a portable terminal will be taken as a specific example and explained in detail.

First, gripping feature samples to be acquired by portable terminals 300, 300', 300", and 300''' according to all embodiments of the present invention will be described. Since human beings are innately different in (1) the lengths of their fingers and (2) the strength of their gripping force and, as an acquired nature, (3) in the habit of gripping a portable terminal, gripping features are extremely suitable as biometric information used for authentication. More specifically, gripping feature authentication has almost the same level of precision as general face authentication in terms of the authorized person rejection rate and the unauthorized person acceptance rate. Gripping feature samples can include, for example, a gripping pressure distribution, a gripping shape distribution and a gripping heat distribution. As an example method of acquiring these gripping feature samples, when pressure sensors are distributed in an array on the portable terminals 300, 300', 300", and 300''', the gripping pressure distribution can be acquired. In the same manner, when CCD (CMOS) sensors are distributed in an array, the gripping shape distribution can be obtained. In the same manner, when infrared sensors are distributed in an array, the gripping heat distribution can be obtained. When a portable terminal has operating keys at the rear surface thereof (touch sensitive panel), gripping features can be acquired even from the pressing states (whether the operating keys or the touch sensitive panel is pressed) of the operating keys (touch sensitive panel) when the terminal is gripped.

Figure 1:
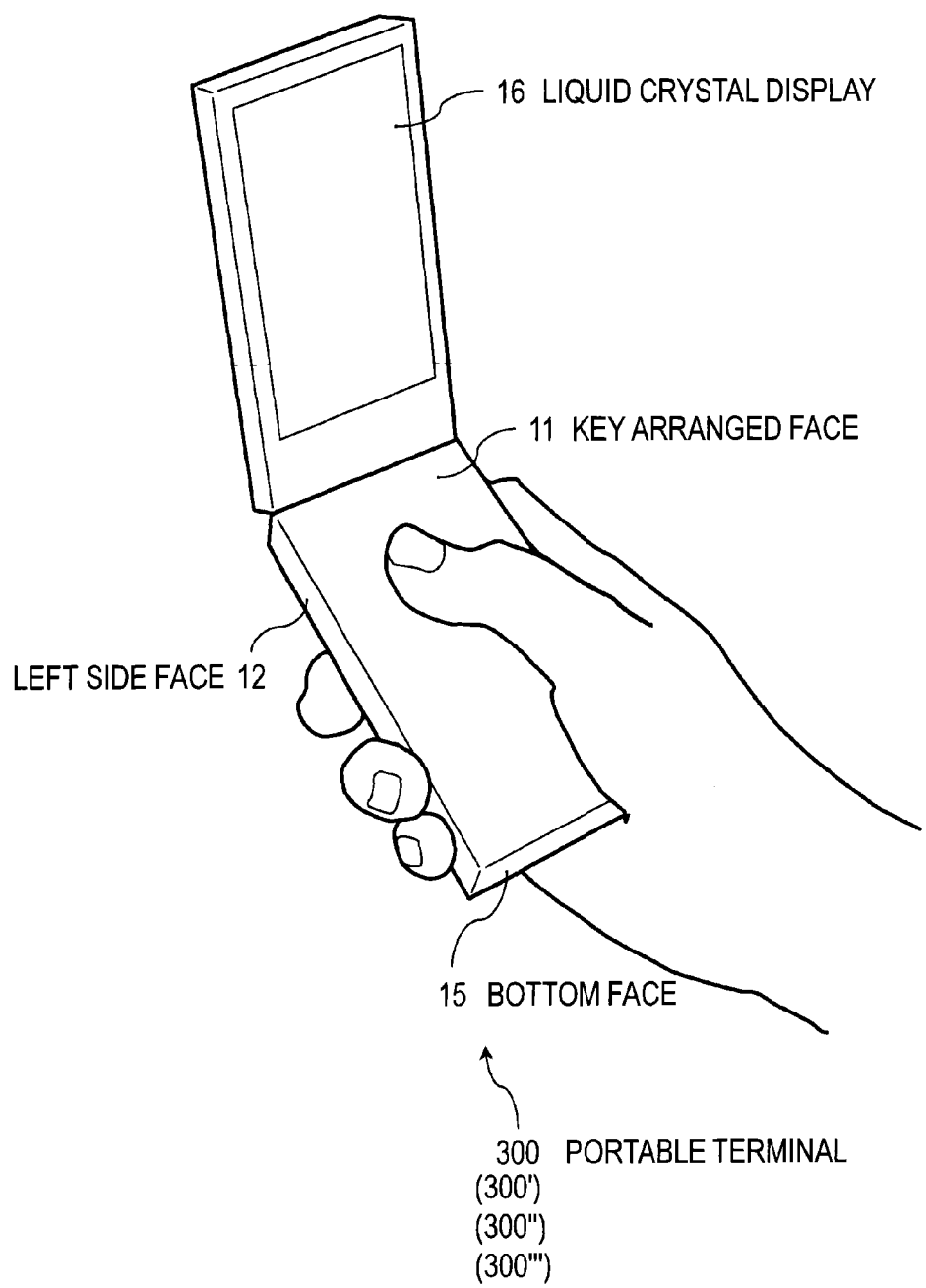
FIG. 1 is an example view showing a state in which a portable terminal is gripped, which is related to all embodiments.

In the following descriptions of the embodiments, a gripping pressure distribution will be used as a gripping feature sample. Acquisition of a gripping feature distribution by using a pressure sensor array will be described in detail with reference to FIG. 1 and FIG. 2. FIG. 1 is an example view showing a state in which the portable terminals 300, 300', 300", and 300''' according to all the embodiments are gripped. FIG. 2 is an example view showing gripping pressure distributions output from a pressure sensor array built into the portable terminals 300, 300', 300", and 300''' according to all the embodiments. It is assumed here that the portable terminals 300, 300', 300", and 300''' are general folding-type portable terminals. Two long-plate-shaped bodies are foldably coupled with a coupling shaft at short sides of the bodies. One of the bodies has operating keys. The surface on which the operating keys are arranged is called a key arranged face 11, the side faces of the key arranged face 11 in the longitudinal direction at the left and right are called a left side face 12 and a right side face 13, the rear surface of the key arranged face 11 is called a rear face 14, and a side face of the key arranged face 11 in the width direction at the bottom (face opposite the face where the coupling shaft is placed) is called a bottom face 15. A liquid crystal display 16 is provided in the other body on a surface facing the key arranged face 11 when the terminal is folded.

The portable terminals 300, 300', 300", and 300''' are configured as described above, but the foregoing description explains merely an example for describing in detail the gripping pressure distributions output from the pressure sensor array, to be described later. Therefore, the portable terminals 300, 300', 300", and 300''' are not necessarily folding-type terminals, such as that shown in FIG. 1, and can have any shapes, such as a straight shape or a sliding shape. Referring back to FIG. 1, it is assumed that the user of the portable terminals 300, 300', 300", and 300''' grips the portable terminals 300, 300', 300", and 300''' as shown in FIG. 1.

A pressure sensor array 105 (indicated by a dotted line in FIG. 2) is arranged so as to be able to detect external gripping pressure, in the body where the key arranged face 11 of the portable terminals 300, 300', 300", and 300''' is arranged. The pressure sensor array 105 can detect the gripping pressure distributions on the left side face 12, the right side face 13, and the rear face 14 of the portable terminals 300, 300', 300", and 300'''. The signal sent from each pressure sensor of the pressure sensor array 105 can be analyzed to draw gripping pressure distributions such as those shown in FIG. 2. It is understood from the gripping pressure distributions shown in FIG. 2 that characteristics of the fingers and the gripping force of the user are exhibited clearly on the left side face 12, the right side face 13, and the rear face 14. The gripping pressure distributions acquired in this way can be used as gripping feature samples in the present invention.

Figure 3A:
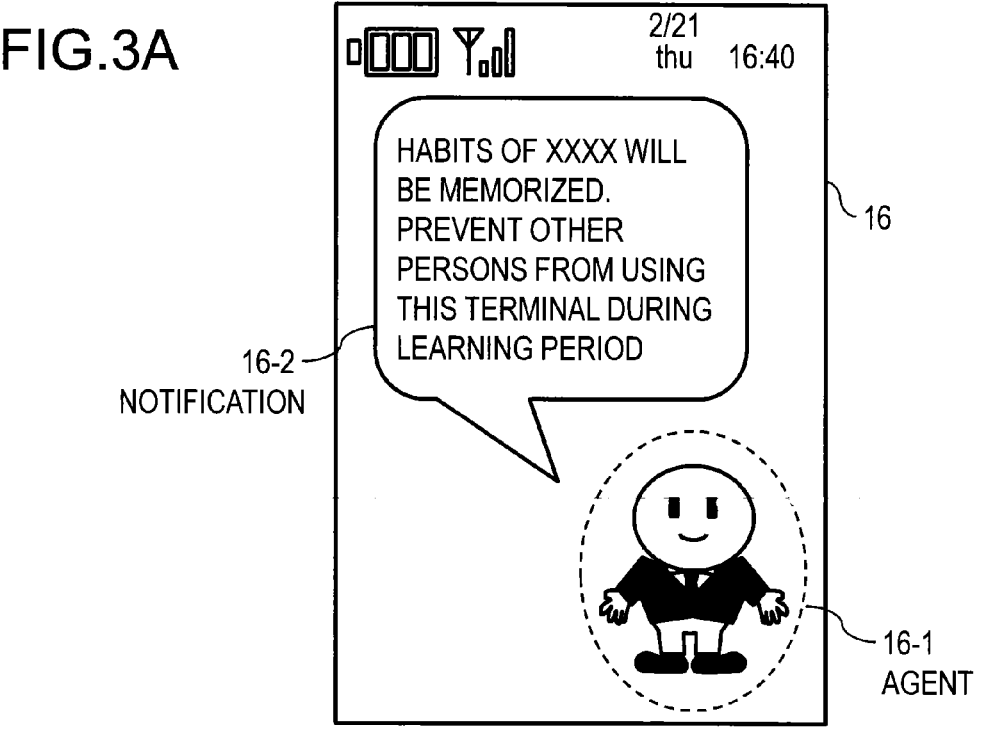
FIG. 3A is an example view showing a notification given to the user by the portable terminal when authentication template learning is started, which is related to all the embodiments.
Figure 3B:
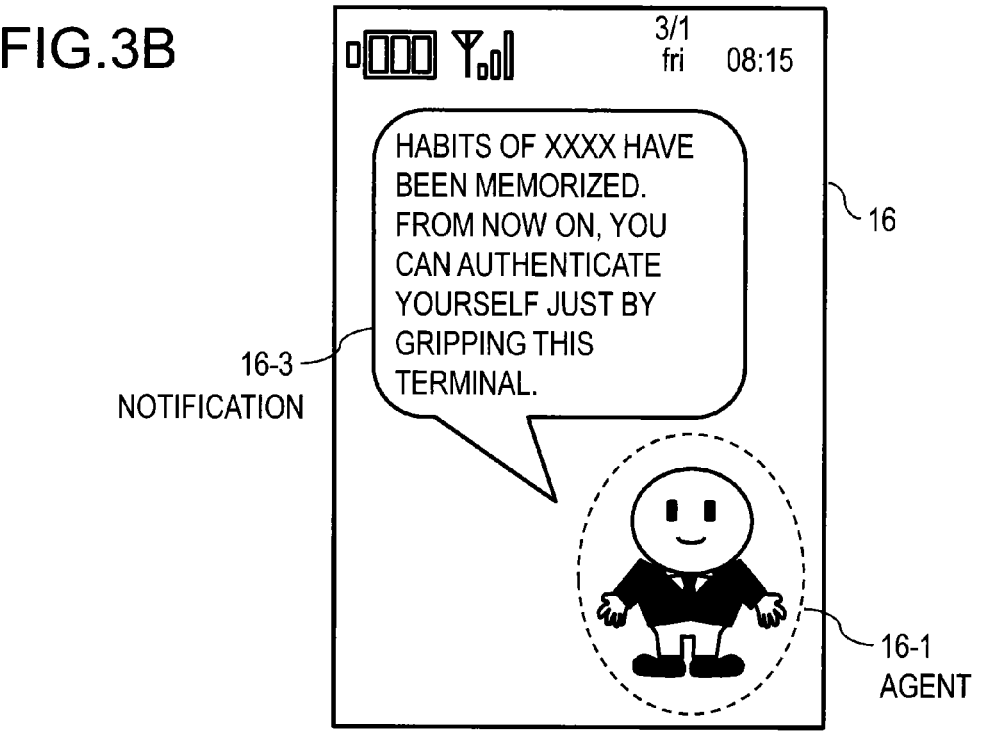
FIG. 3B is an example view showing a notification given to the user by the portable terminal when the authentication template learning is finished, which is related to all the embodiments.

Next, notifications to be given to the user are described with reference to FIGS. 3A and 3B, the notifications being given when the portable terminals 300, 300', 300", and 300''' start and finish learning of an authentication template necessary for authentication, through acquiring gripping feature samples, in the embodiments of the present invention. FIGS. 3A and 3B are example views showing notifications given to the user when the portable terminals 300, 300', 300", and 300''' according to all the embodiments start and finish learning of an authentication template. For example, the portable terminals 300, 300', 300", and 300''' learn an authentication template, to be described later, when the terminals are used for the first time. When learning of an authentication template is started, a screen such as that shown in FIG. 3A is displayed on the liquid crystal display 16. The following notification 16-2 is shown on the liquid crystal display 16 under the assumption that an agent 16-1 residing in the portable terminal talks to the user. "Habits of xxxx (user name) will be memorized. Prevent other people from using this terminal during the learning period." Since the user is not given any notification that specifies a special way of use, as described above, the user continues to use the portable terminals 300, 300', 300", and 300''' in a usual manner without paying special attention.

Gripping feature samples are automatically acquired during the learning period. Gripping feature samples may be acquired at predetermined intervals of time or may be acquired when the user presses a predetermined operating key. Alternatively, gripping feature samples may be acquired upon a trigger (hereafter called a sampling trigger), such as when the user performs a predetermined key operation in a certain mode (such as during email operation or during a call) in the learning period, which will be described in detail in the second and subsequent embodiments. The user is not provided with any information indicating that a gripping feature sample will be taken (was taken) at the moment when a gripping feature sample is taken, or before or after that. Therefore, from the user viewpoint, gripping feature samples are automatically acquired and accumulated at the acquisition timing, such as when the user performs an unconscious key operation or when a predetermined period of time elapses unconsciously. Since gripping feature samples are acquired in this way in the present invention, the samples reflect the state in which the user uses the terminal unconsciously and most spontaneously, in a relaxed manner. By doing so, the variance of observed values in gripping feature samples can be made small.

If acquisition of gripping feature samples is declared in advance, the user would be on guard when receiving the declaration, and may grip the terminal not in a usual way but in a way that the user thinks is correct. The user may forget the usual way of gripping the terminal when receiving a declaration in advance. These would make the acquisition of precise gripping feature samples difficult. This problem can be solved and the acquisition of precise gripping feature samples is made possible if gripping feature samples can be acquired while the user is unconscious of the acquisition, as described above. In the learning period, gripping feature samples are accumulated as described above. When the learning period, determined in advance, has elapsed, a notification such as that a notification 16-3 shown in FIG. 3B is displayed, and the learning period ends.

Modes used in the embodiments will be described in detail with reference to FIG. 14. FIG. 14 is a view illustrating mode classification performed based on similarities in gripping features. As illustrated in FIG. 14, modes include browser 1, browser 2, email, personal information browsing, making calls, application, and menu. The browser 1 mode indicates an operating state of the portable terminal in which a communication fee is being incurred or may be incurred because web pages are being browsed. Therefore, the browser 1 mode corresponds, for example, to an operating state in which browser software installed in the portable terminals 300, 300', 300", and 300''' is activated and the portal page of the portable terminals 300, 300', 300", and 300''' is being browsed. The browser 2 mode indicates an operating state of the portable terminals 300, 300', 300", and 300''', in which a content fee is being incurred or may be incurred because web pages are being browsed. Therefore, the browser 2 mode corresponds, for example, to an operating state in which browser software installed in the portable terminals 300, 300', 300", and 300''' is activated and application software for the portable terminals 300, 300', 300", and 300''' is being downloaded for a fee.

The email mode indicates an operating state in which personal information written in an email may be read. Therefore, the email mode corresponds, for example, to an operating state in which a mailer installed in the portable terminals 300, 300', 300", and 300''' is activated and an email folder of the portable terminals 300, 300', 300", and 300''' is being browsed; a return email is being written with the mailer; or an email is being received. The personal information browsing mode indicates an operating state in which personal information such as that described in an address book is being browsed. Therefore, the personal information browsing mode corresponds, for example, to an operating state in which an address book stored in the portable terminals 300, 300', 300", and 300''' is being browsed. The making calls mode indicates an operating state of the portable terminals 300, 300', 300", and 300''', in which a call fee is being charged. Therefore, the making calls mode corresponds, for example, to an operating state in which a call is being made by using the portable terminals 300, 300', 300'', and 300'''.

The application mode indicates an operating state of the portable terminals 300, 300', 300'', and 300''', in which a communication fee may be incurred or in which personal information may be browsed. Therefore, the application mode corresponds, for example, to an operating state in which application software installed in the portable terminals 300, 300', 300'', and 300''' is activated. The menu mode indicates an operating state of the portable terminals 300, 300', 300'', and 300''', in which personal information may be browsed depending on which screen is selected from the menu of the portable terminals 300, 300', 300'', and 300'''. Therefore, the menu mode corresponds, for example, to an operating state in which the menu screen of the portable terminals 300, 300', 300'', and 300''' is browsed and a target destination is being selected.

When gripping feature samples are acquired separately in the modes of the portable terminal as described above, the gripping feature samples have small variations and are stable. In addition, since the modes are specified according to the situations of use of the portable terminal as described above, authentication can be performed by using gripping features in various situations of use. The modes are specified according to the functions of the portable terminal, such as browsing and emailing, in the above description. The modes are not necessarily specified according to the functions, however, because the modes can be specified according to the orientation of the portable terminal by using information output from a sensor, such as an acceleration sensor, a gyroscope, or a camera.

Figure 17:
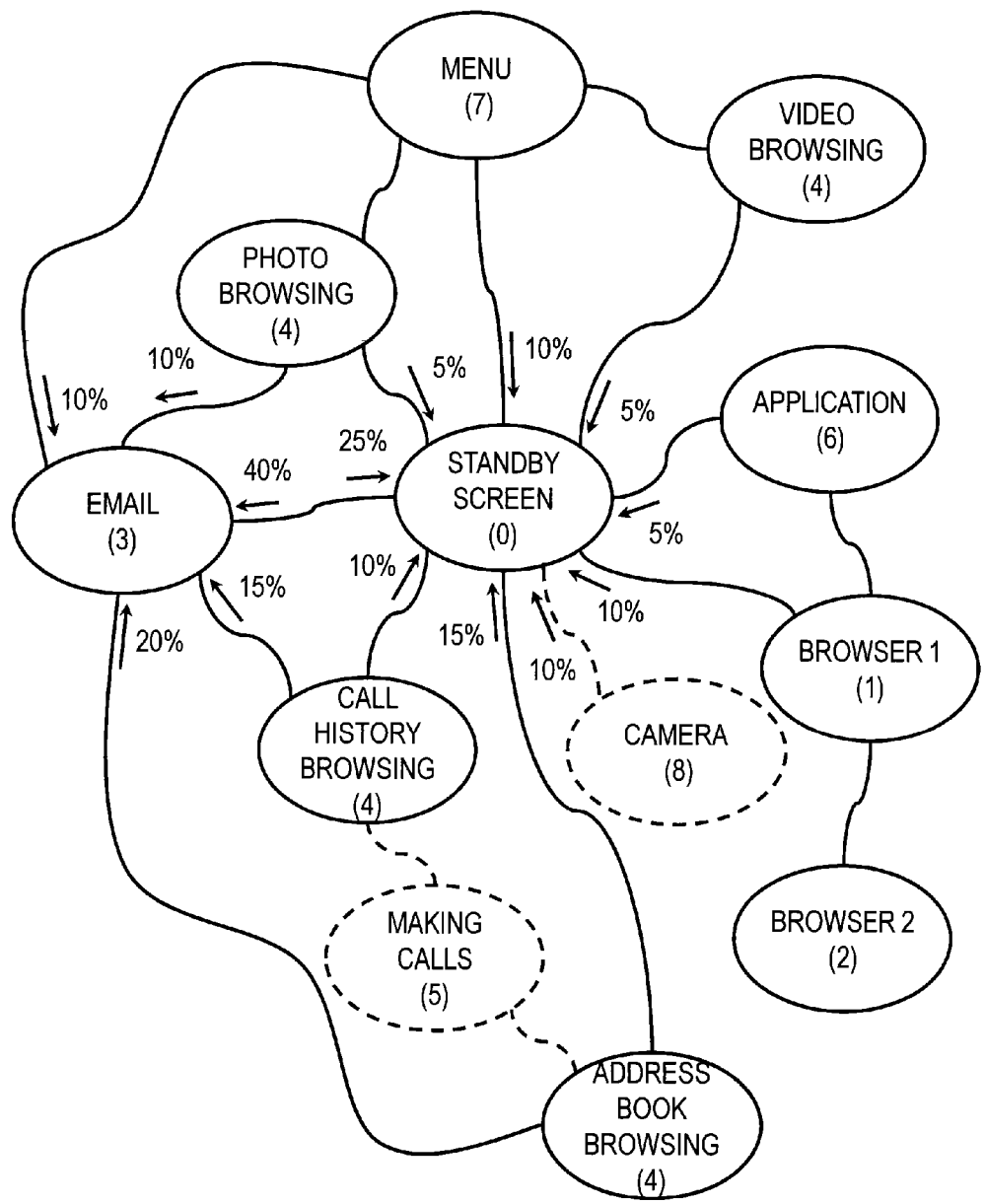
FIG. 17 is a view illustrating transition rates among modes.

With reference again to FIG. 14 and anew to FIG. 15, FIG. 16, and FIG. 17, a method for filling in lacking gripping feature samples if the gripping feature samples are insufficient in a certain mode, which is found after the portable terminals 300, 300', 300'', and 300''' acquired the gripping feature samples in each mode in the embodiments of the present invention is described. As described earlier, for example, the browser 1 mode and the browser 2 mode are similar in that web pages are being browsed with the terminal, and the gripping features are similar to each other because the operating states are similar. If modes having similar gripping features to each other are classified into the same mode category, the browser 1 mode and the browser 2 mode are classified into the same mode category A, as shown in FIG. 14. Mode classification is performed in this way according to the similarity in gripping features among the modes. Mode categories (A, B, C, D, ...) are determined in the following way. For example, the email mode and the application mode are classified into a category B; the personal information browsing mode and the menu mode are classified into a category C; and the making calls mode is classified into a category D, which is different from those of the other modes because the making calls mode has noticeably different gripping features from the other modes. When gripping feature samples are insufficient in a certain mode, gripping feature samples acquired in a mode classified into the same mode category as that mode are used to fill in the lacking gripping feature samples in that mode. When gripping feature samples are insufficient in the browser 1 mode, for example, gripping feature samples acquired in the browser 2 mode are used to fill in the lacking gripping feature samples in the browser 1 mode. In another example, when gripping feature samples are insufficient in the email mode, gripping feature samples acquired in the application mode are used to fill in the lacking gripping feature samples in the email mode.

The description made with reference to FIG. 14 just showed examples in which gripping feature samples in a single mode only were used to fill in the lacking gripping feature samples in a certain mode. The present invention is not limited to these examples, however. Gripping feature samples in two or more similar modes may be used to fill in the lacking gripping feature samples in a certain mode. When two or more similar modes are used to fill in the lacking samples, a sample filling rate can be specified for each mode. The sample filling rate indicates the rate at which gripping feature samples are used for the lacking samples in a certain mode. For example, when P gripping feature samples are lacking in a certain mode, P×g gripping feature samples are used to fill in the lacking samples from another similar mode for which a sample filling rate of g is specified. The sample filling rate for a certain mode is set higher, the more similar the gripping features in that mode are to those in another mode in which gripping feature samples are insufficient. The sample filling rates are specified such that the sum of the sample filling rates specified for all modes from which filling-in of the lacking samples is applied to a certain mode is 1. Methods for filling in the lacking samples will be described more specifically with reference to FIG. 15 and FIG. 16. FIG. 15 and FIG. 16 are views illustrating the filling rate of gripping feature samples, used according to the similarity of gripping features. FIG. 15 shows an example method for filling in the lacking gripping feature samples, used when P gripping feature samples are required and P×g or more gripping features have been acquired in every mode used to fill in the lacking gripping feature samples. In contrast, FIG. 16 shows an example method for filling in the lacking gripping feature samples, used when P×g or more gripping features are not acquired in any of the modes used to fill in the lacking gripping feature samples.

More specifically, in FIG. 15, when the browser 1 mode lacks gripping feature samples, the sample filling rate is set to 0.8 for the browser 2 mode (mode 2), which is most similar in gripping features to the browser 1 mode, and the sample filling rate is set to 0.2 for the email mode (mode 3), which is the second-most similar in gripping features to the browser 1 mode in all of the modes. The sum of the sample filling rate of mode 2 and the sample filling rate of mode 3, 0.8+0.2, is 1.0. As described earlier, it is assumed that the browser 2 mode (mode 2) has already acquired P×0.8 or more gripping features. In the same way, it is assumed that the email mode has already acquired P×0.2 or more gripping features. Therefore, when the browser 1 mode lacks P gripping feature samples, P×0.8 gripping features are acquired from the browser 2 mode and P×0.2 gripping features are acquired from the email mode to fill in the lacking gripping feature samples in the browser 1 mode, completing the number of data items required for learning the authentication template. In the same way, when the browser 2 mode lacks P gripping feature samples, P×0.8 gripping features are acquired from the browser 1 mode and P×0.2 gripping features are acquired from the email mode to fill in the lacking gripping feature samples in the browser 2 mode, completing the number of data items required for learning the authentication template.

In contrast, when P×g or more gripping features are not acquired in any of the modes used to fill in the lacking gripping feature samples, the lacking gripping feature samples are filled in as shown in FIG. 16, as described earlier. For example, when the browser 1 mode lacks P gripping feature samples, if the browser 2 mode (mode 2) has Q2 samples and Q2<P×0.8, the browser 2 mode does not have sufficient gripping feature samples necessary for filling in the lacking samples. In this case, Q2 is used as a reference for the email mode (mode 3), and Q2×¼ (rounded up to the nearest whole number, this also applies to the following cases) data items are used to fill in the lacking samples in the browser 1 mode. The reason why the number of gripping feature samples in the email mode used to fill in the lacking samples is one-fourth of that in the browser 2 mode is that the filling rate between modes is set the same as in FIG. 15 to maintain the precision of the authentication template to be learned, at a predetermined level or more. If the email mode (mode 3) also lacks gripping feature samples necessary for filling in the lacking samples, in other words, if the email mode has Q3 acquired gripping feature samples and Q3<Q2×¼, only the Q3 gripping feature samples are acquired from the email mode, and the Q2 gripping feature samples are acquired from the browser 2 mode to fill in the lacking samples in the browser 1 mode. When the browser 2 mode (mode 2) has Q2 acquired gripping feature samples and Q2≥P×0.8, if the email mode has Q3 acquired gripping feature samples and Q3<P×0.2, meaning that the samples are insufficient, only the Q3 gripping feature samples are acquired from the email mode and P×0.8 gripping feature samples are acquired from the browser 2 mode to fill in the lacking samples in the browser 1 mode. With the processing described above, the predetermined ratio is not equal in some cases to the ratio of the number of gripping feature samples acquired from a mode having a high sample filling rate to the number of gripping feature samples acquired from a mode having a low sample filling rate, but the precision can be maintained if the rate of gripping feature sample acquisition from a mode having a high sample filling rate is equal to or higher than the sample filling rate. If the rate of gripping feature sample acquisition from a mode having a high sample filling rate is equal to or lower than the sample filling rate, the precision may be not maintained. Even with a slightly lower precision, if gripping feature samples required for learning need to be acquired anyway, operation is possible even in this state.

Next, another method for filling in the lacking gripping feature samples, which is different from the method above, will be described with reference to FIG. 17. FIG. 17 is a view illustrating the transition rates between modes. As described earlier, various modes (such as a browser mode, an email mode, a making calls mode, and an application mode) can be specified in the portable terminal. Usually, the user of the portable terminal operates it while switching between these plurality of modes. For example, starting from a standby screen mode (mode 0), the user switches to an email mode (mode 3), switches to a photo browsing screen (personal information browsing mode) when writing an email, attaches a photo to the email, then switches back to the email mode, and returns to the standby screen after sending the email. It is found that gripping features in the transition destination mode are very similar to those in the transition source mode, with some exceptions excluded. Some exceptions include a making calls mode and a camera mode. When making a call or using the camera, the user usually re-grips the portable terminal, and in many cases, the user re-grips the portable terminal in a gripping state which is very different from the gripping state in the transition source mode. Therefore, exceptionally, this method for filling in the lacking samples cannot be used in the making calls mode or the camera mode. It is also found that the similarity between a transition source mode and a transition destination mode has a correlation with R=t/T×100(%) (hereafter called a transition source occupation rate), where t indicates the number of events in which the user transits from the transition source mode to the transition destination mode, and T indicates the number of events in which the user transits from all transition source modes to the transition destination mode. By using these relationships, the lacking gripping feature samples can be filled in.

The data (R, the transition source occupation rate) for using the above correlation can be obtained by recording the portable terminal operation history (mode transition history) of the user and analyzing the history. Specifically, in a case where the standby screen (mode 0) is set to the transition destination mode, for example, the transition source modes include the browser 1 mode, the email mode, the photo browsing screen (personal information browsing mode), a call history browsing screen (personal information browsing mode), an address book browsing screen (personal information browsing mode), a video browsing screen (personal information browsing mode), the application mode, the menu mode, and the camera mode. When the portable terminal operation history of the user is recorded and analyzed, transition source occupation rates can be obtained as shown in FIG. 17, where the browser 1 mode has a transition source occupation rate of 10%, the email mode has a transition source occupation rate of 25%, the personal information browsing mode (the photo browsing screen+the call history browsing screen+the address book browsing screen+the video browsing screen) has a total transition source occupation rate of 35%, the application mode has a transition source occupation rate of 5%, the menu mode has a transition source occupation rate of 10%, and the camera mode has a transition source occupation rate of 10%. Here, the sum of the rates is 10%+25%+35%+5%+10%+10%=95% and is not 100%, but it is assumed that the remaining 5% is occupied by other transition sources, not shown in the figure. In another case where the email mode is set to the transition destination mode, for example, it is assumed, as shown in FIG. 17, that the standby screen (mode 0) has a transition source occupation rate of 40%, the personal information browsing mode has a transition source occupation rate of 45%, and the menu mode has a transition source occupation rate of 10%. Since the similarity between modes has a correlation with the transition source occupation rate, as described earlier, when the lacking gripping feature samples in the email mode is filled in with gripping feature samples acquired in the standby screen (mode 0) by 40%, gripping feature samples acquired in the personal information browsing mode by 45%, gripping feature samples acquired in the menu mode by 10%, and other gripping feature samples by 5%, the precision of the authentication template learned with these samples can be increased because the samples in modes highly similar to the email mode are used.

First Embodiment

Figure 4:
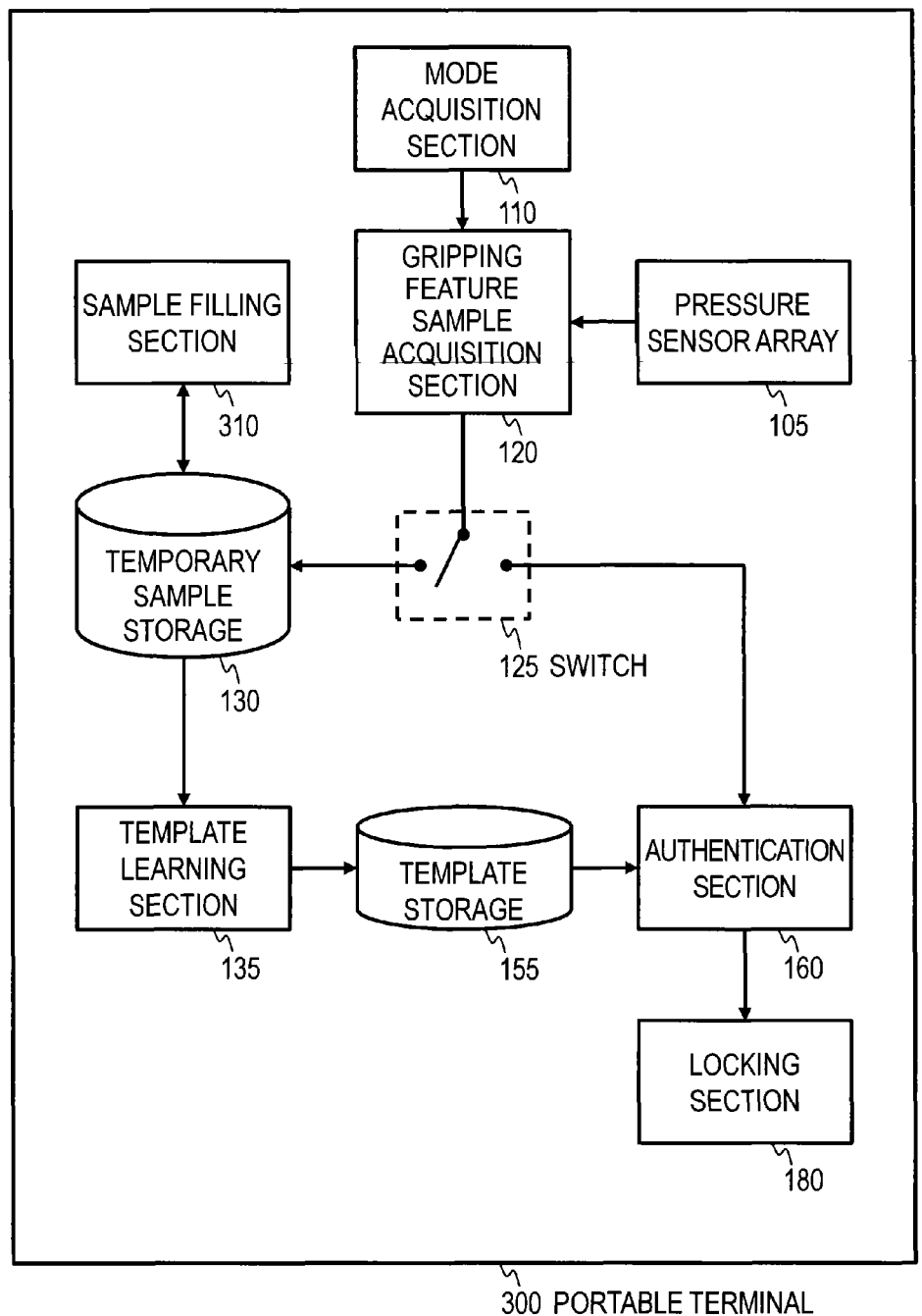
FIG. 4 is a block diagram showing the structure of a portable terminal according to a first embodiment.
Figure 8:
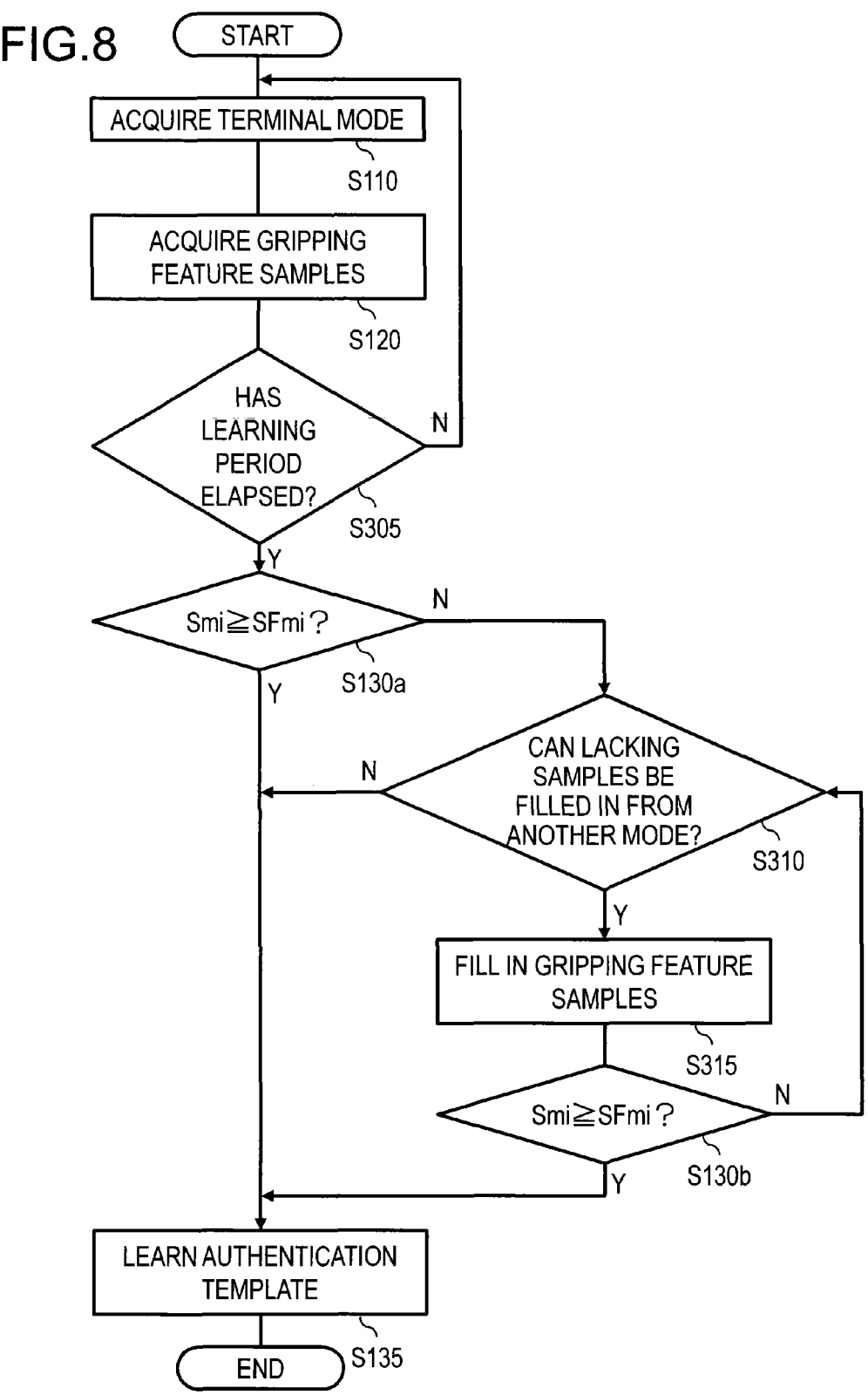
FIG. 8 is a flowchart showing the operation of the portable terminal according to the first embodiment in a learning state.

With the above described conditions being used as a premise, a portable terminal 300 for implementing authentication by acquiring gripping feature samples according to a first embodiment will be described in detail. The operation of the portable terminal 300 according to the first embodiment in a learning state will be described first with reference to FIG. 4 and FIG. 8. FIG. 4 is a block diagram showing the structure of the portable terminal 300. FIG. 8 is a flowchart showing the operation of the portable terminal 300 in the learning state. The portable terminal 300 includes a pressure sensor array 105, a mode acquisition section 110, a gripping feature sample acquisition section 120, a switch 125, a temporary sample storage 130, a sample filling section 310, a template learning section 135, a template storage 155, an authentication section 160, and a locking section 180. As described earlier, the portable terminal 300 is provided with the switch 125, and the switch 125 can switch between the learning state (switch to the temporary sample storage 130 and an authentication state (switch to the authentication section 160) in the portable terminal 300. It is assumed here that the switch 125 is set to the learning state. The pressure sensor array 105 is disposed on a surface of the portable terminal 300, as described earlier.

First, the mode acquisition section 110 acquires the mode of the portable terminal 300 (S110). The gripping-feature sample acquisition section 120 acquires gripping feature samples from the pressure sensor array 105 (S120). It is determined whether a predetermined learning period has elapsed (S305). If the learning period has elapsed, the processing proceeds to step S130a. If the learning period has not yet elapsed, the processing returns to the start, and steps S110 and S120 are repeated. It is assumed here that the total number of modes is n (n is an integer equal to 1 or more), the number of gripping feature samples already acquired in the i-th mode is Smi, and the number of learning-start samples is SFmi. The number of learning-start samples, SFmi, means a predetermined number of samples required for learning the authentication template. It is already found that, even if the authentication template is learned with a small number of acquired gripping feature samples, the authentication template cannot be generated with a sufficient precision. Therefore, the number of samples empirically found to be required to obtain a highly precise authentication template is set in the number of learning-start samples, SFmi. Consequently, when the number of gripping feature samples, Smi, in each of all the modes (i=1 to n) stored in the temporary sample storage 130 reaches the number of learning-start samples, SFmi, (Smi≥SFmi), the processing proceeds to step S135, and the template learning section 135 learns the authentication template with the gripping feature samples in each mode and stores the learned authentication template for each mode in the template storage 155 (S135). The authentication template is generated from the average of the gripping feature samples (gripping pressure distributions in all the embodiments) and other factors.

If the number of gripping feature samples, Smi, in one or more modes (i=1 to n) stored in the temporary sample storage 130 does not reach the number of learning-start samples, SFmi, (Smi<SFmi), the processing proceeds to step S310. If it is determined in step S310 that the number of gripping feature samples acquired in any mode (hereafter called the k-th mode, where k is an integer ranging from 1 to n, both inclusive) among all the modes (i=1 to n) is insufficient (Smi<SFmi) and the lacking samples can be filled in with samples acquired in another mode, the sample filling section 310 fills in the lacking gripping feature samples in the k-th mode with gripping feature samples acquired in a mode other than the k-th mode (S315). When the number of gripping feature samples, Smi, in every mode (i=1 to n) satisfies Smi≥SFmi with this filling in, the processing proceeds to step S135, and the template learning section 135 learns the authentication template in each mode with the filled-in gripping feature samples and stores the learned authentication template for each mode in the template storage 155 (S135).

In contrast, if it is determined in step S130b that the number of gripping feature samples, Smi, in any mode (i=1 to n) does not satisfy Smi≥SFmi with the above-described filling-in, the processing returns to step S310, and it is determined whether the lacking gripping feature samples can be filled in from another mode. If the lacking gripping feature samples cannot be filled in from another mode, the processing proceeds to step S135, and the template learning section 135 learns the authentication template in each mode with the gripping feature samples and stores the learned authentication template for each mode in the template storage 155 (S135). As described earlier, the lacking samples in the k-th mode can be filled in from a mode in the same mode category (A, B, C, D, . . . ) as the k-th mode. The number of gripping feature samples used to fill in the lacking samples in each mode can be determined by using the sample filling rate or the transition source occupation rate, described earlier.

Figure 10:
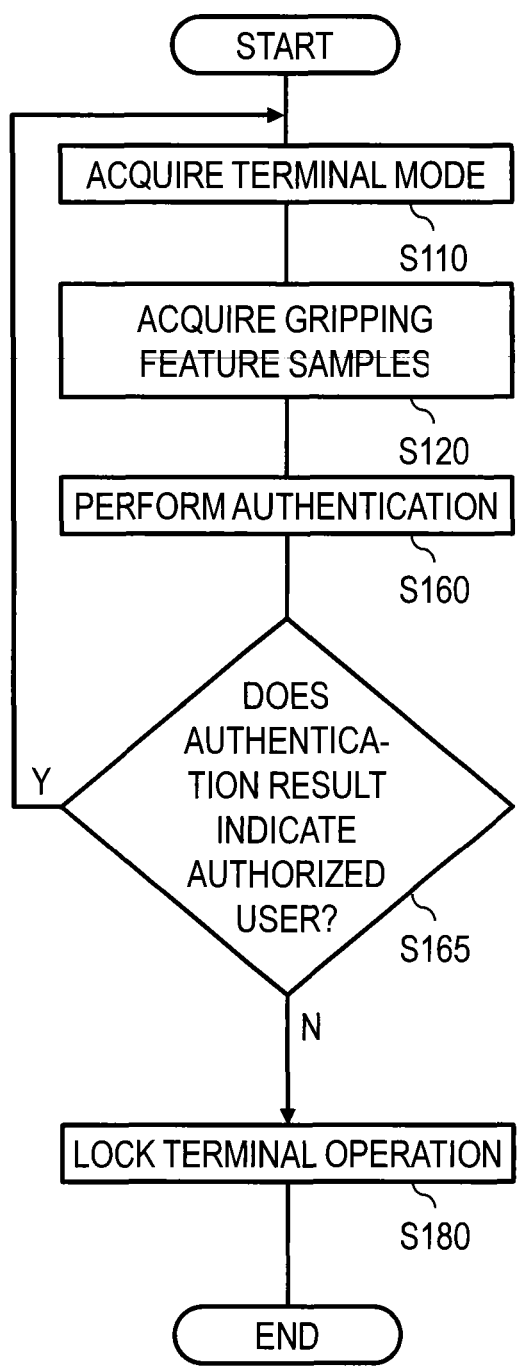
FIG. 10 is a flowchart showing the operation of the portable terminal according to the first embodiment in an authentication state.

Next, with continuing reference to FIG. 4 and to FIG. 10 newly, the operation of the portable terminal 300 in the authentication state according to the first embodiment will be described. FIG. 10 is a flowchart showing the operation of the portable terminal 300 in the authentication state according to the present embodiment. It is assumed here that the switch 125 of the portable terminal 300 sets the state to the authentication state. It is also assumed that, when the authentication state starts, the learning state described above has been already completed, and the authentication template has already been stored in the template storage 155 for every mode (i=1 to n). First, the mode acquisition section 110 acquires the mode of the portable terminal 300 (S110). The gripping-feature sample acquisition section 120 acquires gripping feature samples from the pressure sensor array 105 (S120). Next, the authentication section 160 compares the learned authentication template with the gripping feature samples to perform authentication (S160). If this authentication fails (No in S165), the locking section 180 locks a part or the whole of the functions of the portable terminal 300 (S180). If the authentication is successful, the locking operation is not performed, and the processing returns to step S110 when a predetermined period of time elapses or when a mode transition occurs. The authentication template and the gripping feature samples can be compared in the following way, for example. The authentication section 160 calculates the distance (for example, Mahalanobis's generalized distance) between the authentication template and the gripping feature samples acquired in the authentication state. The authentication section 160 determines that the acquired gripping feature samples were acquired from the authentication target when the distance is equal to or shorter than a predetermined value. The authentication section 160 determines that the acquired gripping feature samples were not acquired from the authentication target when the distance is longer than the predetermined value. As described above, according to the portable sample 300 of the present embodiment, a highly precise authentication template can be learned in each mode in a short learning period because the lacking gripping feature samples in one mode can be filled in with gripping feature samples in another similar mode even if authentication is performed with gripping features in various modes.

Examples of the distance serving as a determination criterion, described earlier, will be explained below. It is assumed here, for example, that a pressure value $x_{i,j}$ was acquired from the i-th sensor element in the j-th measurement performed for learning, where i=1, 2, . . . , n, j=1, 2, . . . , m, n indicates the number of sensor elements and is an integer equal to 2 or more, and m indicates the number of gripping feature measurements for learning and is an integer equal to 2 or more. The average of the pressure values, the variance, and the vectors of the average and the variance are defined as follows:

$$\bar{x}_i = \frac{1}{m}\left(\sum_{j=1}^{m} x_{i,j}\right)$$

-continued $$s_i^2 = \frac{1}{m}\sum_{j=1}^{m}(\bar{x}_i - x_{i,j})^2$$

$$X = (\bar{x}_1, \bar{x}_2, \ldots, \bar{x}_n); S^2 = (s_1^2, s_2^2, \ldots, s_n^2)$$

The authentication template is indicated with a subscript "le". The Mahalanobis's generalized distance $f_1$ is given by the following expression.

$$f_1 = \left[\sum_{i=1}^{n}\left(\frac{x_i - {}_{le}\bar{x}_i}{s_i}\right)^2\right]^{1/2}$$

As another example distance, the Euclid distance $f_2$ can be defined by the following expression.

$$f_2 = \left[\sum_{i=1}^{n}(x_i - {}_{le}\bar{x}_i)^2\right]^{1/2}$$

As still another example distance, the Manhattan distance $f_3$ can be defined by the following expression.

$$f_3 = \sum_{i=1}^{n}|x_i - {}_{le}\bar{x}_i|$$

These three distances can be used to perform authentication with the following determination expression in common. Data of the authentication target, acquired for determination, is indicated with a subscript "self", and data of other people is indicated with a subscript "Oth". When the threshold used to determine other people is defined as $x_{thre}$, the following expression can be used to determine other people.

$$x_{thre} < {}_{Oth}f$$

It is assumed here that gripping-feature sample data of other people is available in some method, such as embedding the data in the portable terminal in advance, allowing the user to access the data on the Internet, or allowing the user to acquire the data by asking other people to grip the portable terminal. From the data of other people and the authentication template, the distance ${}_{Oth}f$ is calculated. The threshold $x_{thre}$ is determined to satisfy the following condition after the distance ${}_{self}f$ is calculated from gripping feature samples of the authentication target, not used for template learning and the learned template.

$$_{self}f < x_{thre} < {}_{Oth}f$$

The authentication template is obtained from the average of gripping feature samples in the foregoing description. However, other methods can be used. For example, a pressure distribution acquired from n sensor elements is divided into appropriate areas (10 areas, for example, where n is larger than 10); the sum (or the average) of gripping pressure in each of the areas is calculated to generate vector data consisting of the sums (or the averages) of gripping pressure in the area; and such vector data is generated for m gripping feature samples, and the average thereof is used as the template. Alternatively, the positions of the sensor elements having the top 20 pressure values among n sensor elements are recorded; vector data thereof is generated; and such vector data is generated for m gripping feature samples, and the average thereof is used as the template.

Second Embodiment

Figure 5:
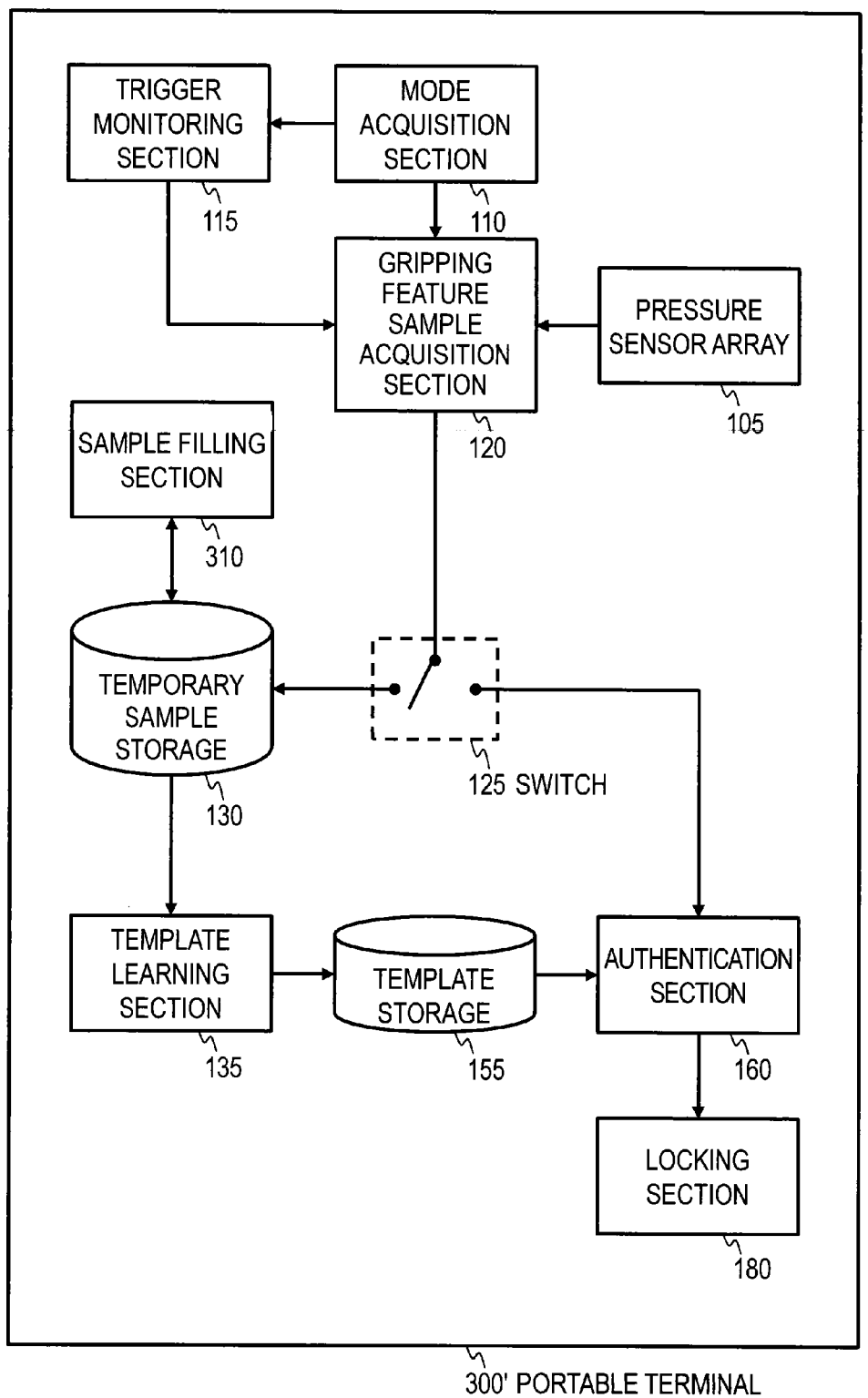
FIG. 5 is a block diagram showing the structure of a portable terminal according to a second embodiment.
Figure 9:
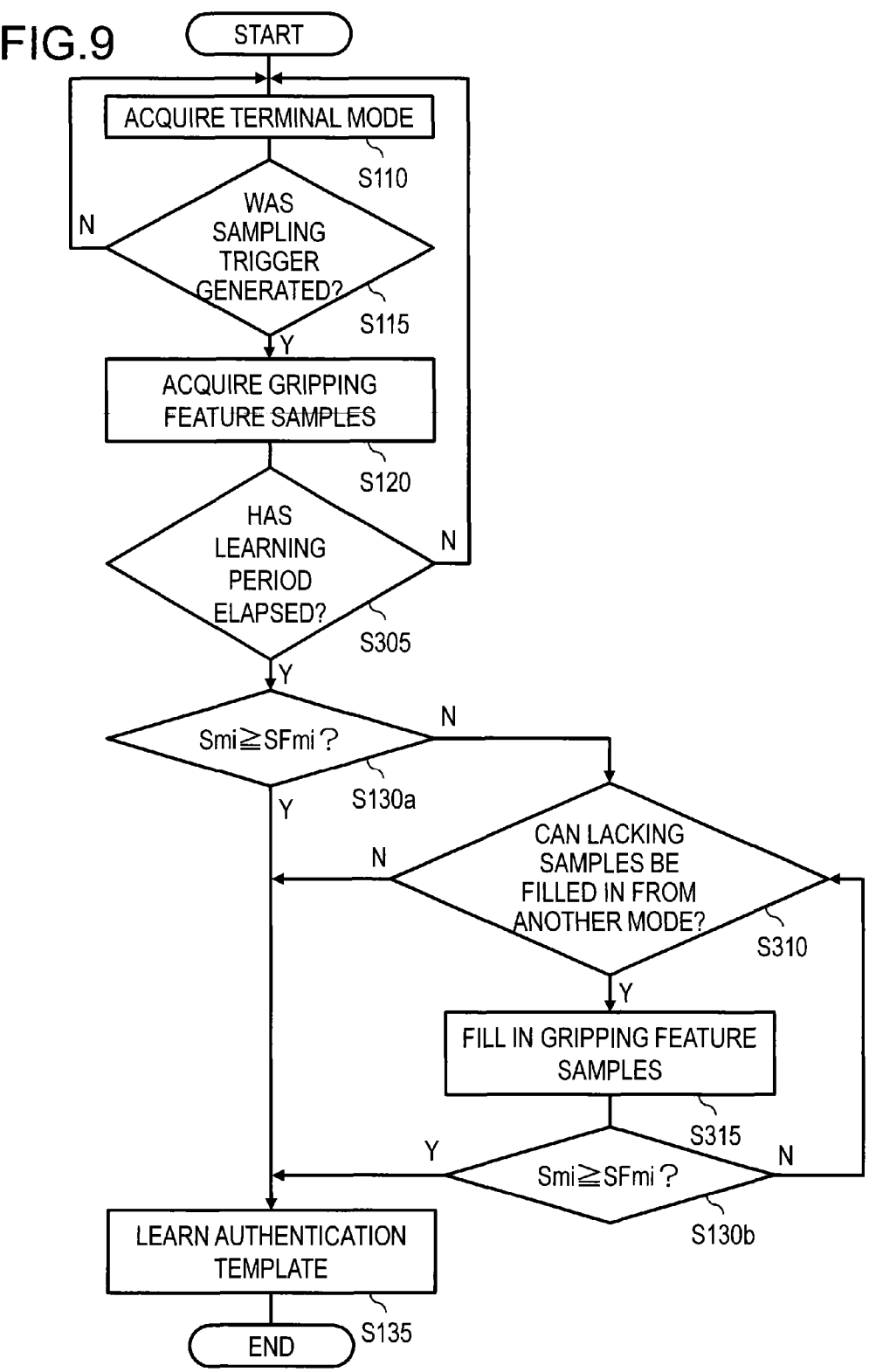
FIG. 9 is a flowchart showing the operation of the portable terminals according to the second, third, and fourth embodiments in a learning state.

A portable terminal 300 according to a second embodiment, which is an example terminal in which the learning function and the authentication function of the portable terminal 300 according to the first embodiment, described above, have been further improved, will be described in detail. The operation of the portable terminal 300' according to the second embodiment in a learning state will be described first with reference to FIG. 5 and FIG. 9. FIG. 5 is a block diagram showing the structure of the portable terminal 300'. FIG. 9 is a flowchart showing the operation of the portable terminal 300' in the learning state. As shown in FIG. 5, the portable terminal 300' is made by adding a trigger monitoring section 115 to the configuration shown in FIG. 4. Since the operation of each section other than the trigger monitoring section 115 is exactly the same as that of the section having the same reference numeral in the first embodiment, a description thereof is omitted, if unnecessary. It is assumed here that the switch 125 is set to the learning state. First, the mode acquisition section 110 acquires the mode of the portable terminal 300' (S110). The trigger monitoring section 115 outputs a gripping-feature acquisition signal when a sampling trigger determined in each mode is generated (Yes in S115). If the sampling trigger is not generated, the processing returns to the start, and the mode acquisition section 110 newly acquires the mode of the portable terminal 300' (No in S115 and S110). In response to the gripping-feature acquisition signal sent from the trigger monitoring section 115, the gripping-feature sample acquisition section 120 acquires gripping feature samples from the pressure sensor array 105 (S120). It is determined whether a predetermined learning period has elapsed (S305). If the learning period has elapsed, the processing proceeds to step S130a. If the learning period has not yet elapsed, the processing returns to the start, and steps S110 to S120 are repeated. Since the operation after the learning period is exactly the same as in the first embodiment, a description thereof is omitted.

Sampling triggers will be described here with reference to FIG. 19. FIG. 19 is a view illustrating example modes, example sampling triggers in the modes, and example other-person determination lines. As described earlier, the modes include, for example, the browser 1 mode, the browser 2 mode, the email mode, the personal information browsing mode, the making calls mode, the application mode, and the menu mode. The sampling trigger specified for the browser 1 mode is "browser in operation ∩ pressing OK key". This means that, when the user presses an OK key in the portable terminal 300' if the browser is in operation, the operation is used as the sampling trigger, and gripping feature samples are acquired. The sampling trigger specified for the browser 2 mode is "browser in operation ∩ pressing OK key". This is the same as in the browser 1 mode. The sampling trigger specified for the email mode is "mailer in operation ∩ pressing OK key". This means that, when the user presses the OK key in the portable terminal 300' if the mailer is in operation, the operation is used as the sampling trigger, and gripping feature samples are acquired. The sampling trigger specified for the personal information browsing mode is "personal information being displayed ∩ pressing OK key". This means that, when the user presses the OK key in the portable terminal 300' if personal information, such as an address book, is being displayed, the operation is used as the sampling trigger, and gripping feature samples are acquired. Pressing the OK key is just an example of a sampling trigger caused by pressing a key. Depending on the mode, pressing any operating key may be specified as a sampling trigger.

Unlike in the modes described above, operating keys such as the OK key are not pressed much in some modes. For example, in the making calls mode, since operating keys are not pressed much, a sampling trigger is generated automatically once every five minutes to acquired gripping feature samples, without depending on the pressing of operating keys. In the application mode, since different operating keys are pressed depending on the application, a sampling trigger is automatically generated once every five minutes. The time period of five minutes in which the sampling trigger is generated automatically is just an example, and any time period appropriate for the mode and the type of the portable terminal may be specified. In the menu mode, "menu screen being displayed ∩ pressing OK key" is specified as the sampling trigger.

As described above, by specifying the timing at which a stable gripping state is expected as the sampling trigger in a mode, stable gripping feature samples can be acquired with low variations. Since the user unconsciously generates the sampling trigger in each mode in the portable terminal, and gripping features are automatically acquired at the timing when the sampling trigger is generated, precise gripping feature samples are acquired.

Figure 11:
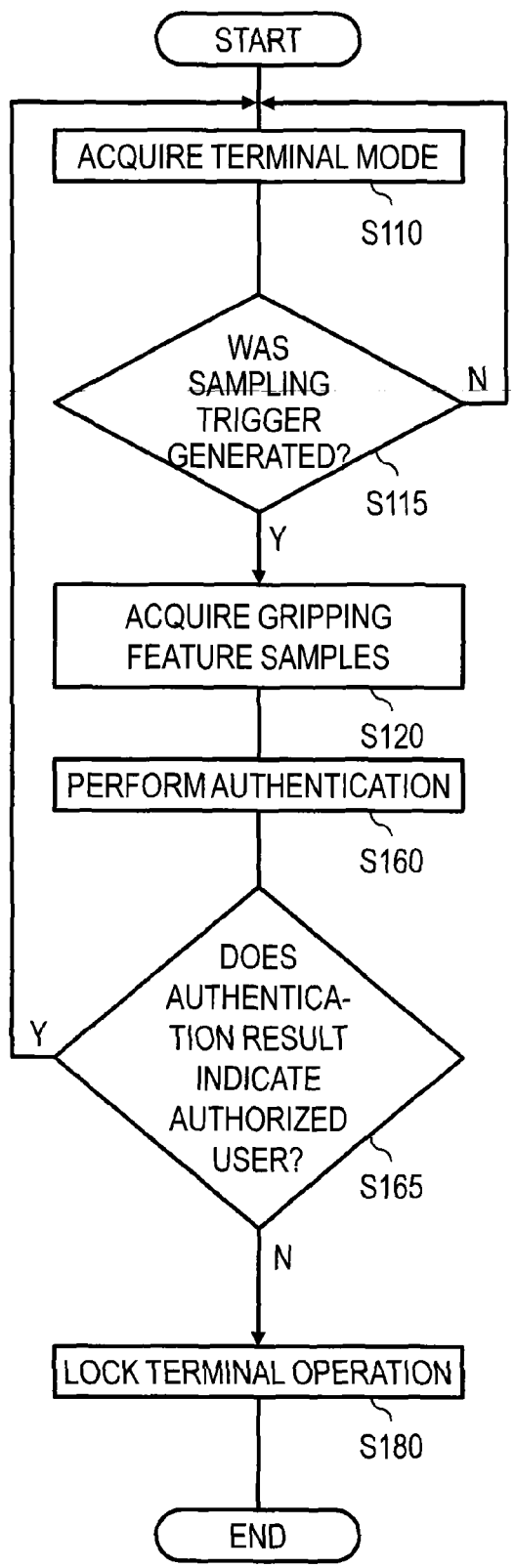
FIG. 11 is a flowchart showing the operation of the portable terminal according to the second embodiment in an authentication state.

Next, with continuing reference to FIG. 5 and to FIG. 11 newly, the operation of the portable terminal 300' in the authentication state according to the second embodiment will be described. FIG. 11 is a flowchart showing the operation of the portable terminal 300' in the authentication state according to the present embodiment. In the same way as in the operation in the learning state of the present embodiment, the only difference from the first embodiment is that it is determined in step S115, which is prior to step S120, whether the sampling trigger is generated. The mode acquisition section 110 acquires the mode of the portable terminal 300' (S110). The trigger monitoring section 115 determines whether the sampling trigger specified in each mode is generated (S115), and if it is generated, outputs the gripping-feature acquisition signal. If the sampling trigger is not generated, the processing returns to the start, and the mode acquisition section 110 newly acquires the mode of the portable terminal 300' (S110). In response to the gripping-feature acquisition signal sent from the trigger monitoring section 115, the gripping-feature sample acquisition section 120 acquires gripping feature samples from the pressure sensor array 105 (S120). Since processes in and after step S160 are the same as those in the authentication state (FIG. 10) of the portable terminal 300 of the first embodiment, a description thereof is omitted.

Third Embodiment

Figure 6:
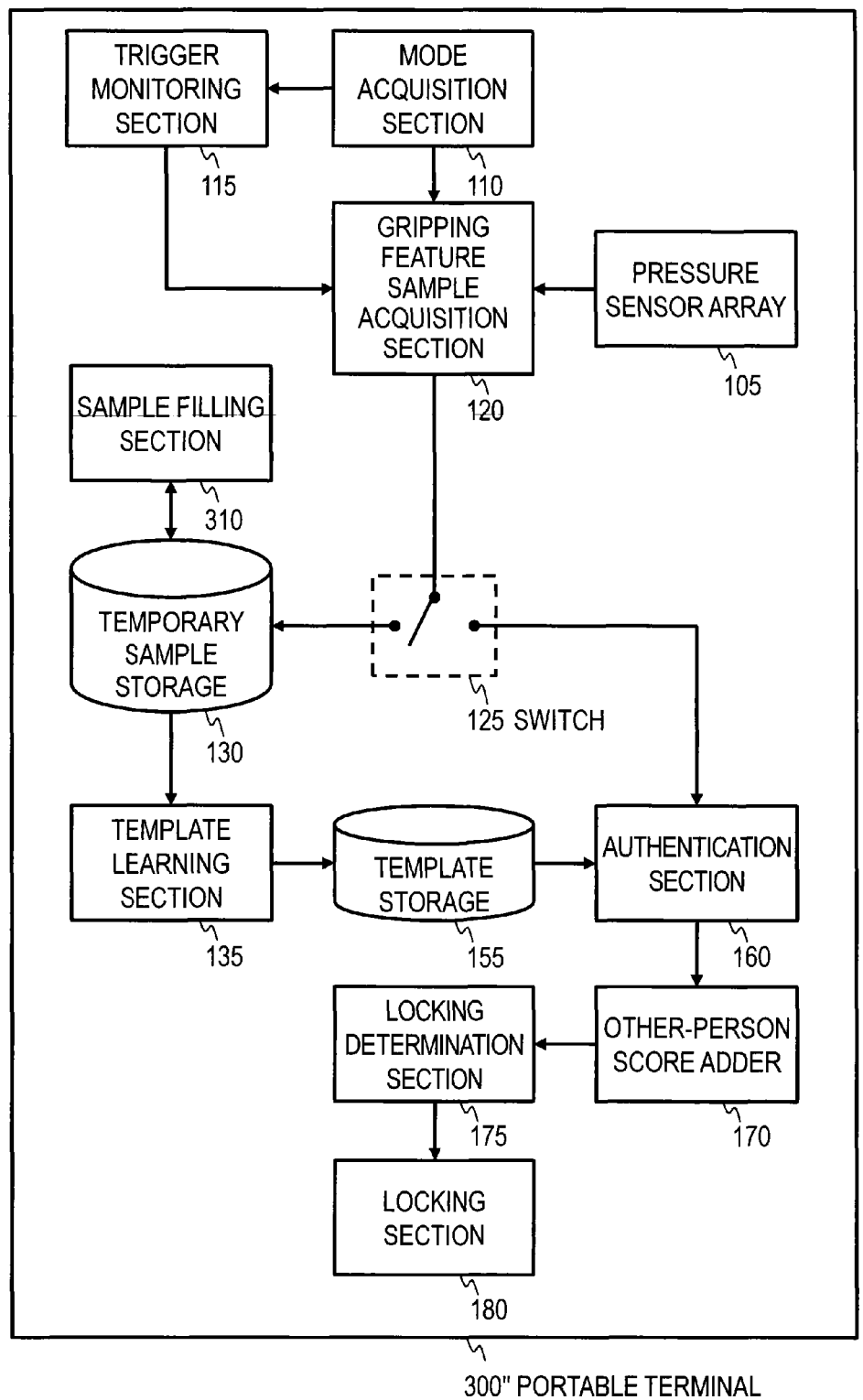
FIG. 6 is a block diagram showing the structure of a portable terminal according to a third embodiment.
Figure 12:
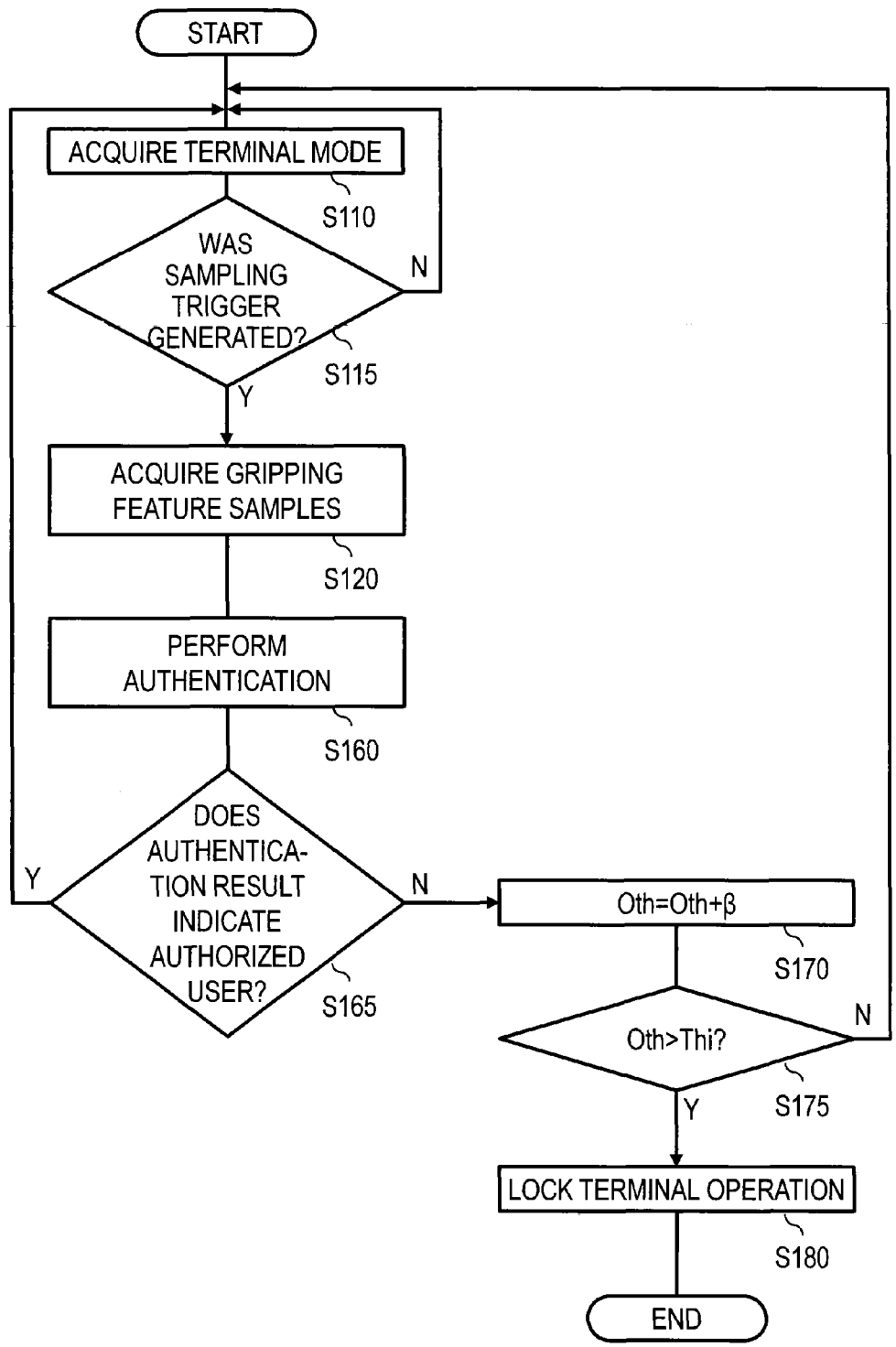
FIG. 12 is a flowchart showing the operation of the portable terminal according to the third embodiment in an authentication state.

A portable terminal 300" according to a third embodiment will be described in detail with reference to FIG. 6 and FIG. 12, which is an example terminal in which the authentication function of the portable terminal 300' according to the second embodiment, described above, has been further improved. FIG. 6 is a block diagram showing the structure of the portable terminal 300". FIG. 12 is a flowchart showing the operation of the portable terminal 300" in an authentication state. As shown in FIG. 6, the portable terminal 300" is made by adding an other-person score adder 170 and a locking determination section 175 to the configuration of the portable terminal 300' of the second embodiment, shown in FIG. 5.

Since the operation of each section other than the other-person score adder 170 and the locking determination section 175 is exactly the same as that of the section having the same reference numeral in the second embodiment, a description thereof is omitted. In the second embodiment (FIG. 11), if the authentication by the authentication section 160 fails in step S165, the locking section 180 immediately locks some or all of the functions of the portable terminal 300' (S180), whereas, in the third embodiment, the portable terminal 300" is not immediately locked when authentication fails just once, which is different from the second embodiment. More specifically, if the authentication by the authentication section 160 fails, the other-person score adder 170 adds a predetermined score β to the other-person score Oth (it is assumed that the initial value thereof is 0) (S170). The score β to be added can be appropriately adjusted such that the authentication operation is optimum. The larger the score β to be added at a time, the shorter the period of time until the terminal is locked. The locking determination section 175 determines whether the other-person score (Oth) has exceeded a threshold Thi (called an other-person determination line, and it is assumed that Thi>β) predetermined for each mode i (i= 1, . . . , n) (S175). If the other-person score has exceeded the threshold Thi, the locking determination section 175 determines that the authentication failed, and the locking section 180 locks some or all of the functions of the portable terminal 300" (S180). If the other-person score (Oth) has not exceeded the predetermined threshold (the other-person determination line, Thi), the locking determination section 175 does not determine that the authentication failed, and the processing goes back to the start.

Figure 18:
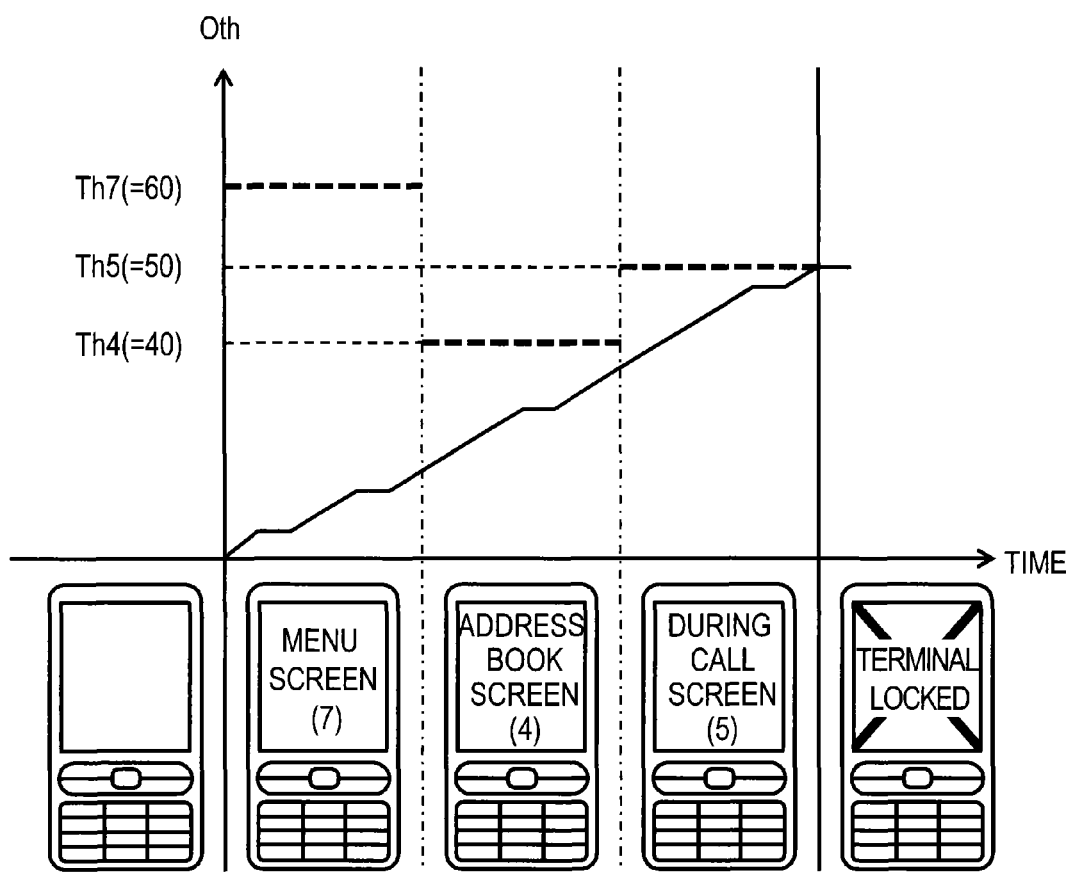
FIG. 18 is a view illustrating the operation of an other-person score adder and a locking determination section in the portable terminals according to the third and fourth embodiments.

The operations of the other-person score adder 170 and the locking determination section 175, described above, will be described in more detail with reference to FIG. 18. FIG. 18 is a view illustrating the operations of the other-person score adder 170 and the locking determination section 175 in the portable terminal 300" of the present embodiment. A graph in FIG. 18 shows how the other-person score (Oth) accumulates over time, where the horizontal axis indicates time, and the vertical axis indicates the other-person score (Oth). This graph is generated assuming that a third party, who is not the user of the portable terminal 300", operates the portable terminal 300", opens the menu screen of the portable terminal 300", browses the address book, and makes a phone call. It is also assumed that the threshold Thi (the other-person determination line) differs depending on the mode i. For example, if it is assumed that a malicious third party operates the portable terminal 300", the level of emergency for locking the terminal differs between when the third party operates the menu screen and when the third party browses personal information such as the address book. Therefore, when a threshold Th7 is set to 60 for the menu mode (mode 7) and a threshold Th4 is set to 40 for the personal information browsing mode (mode 4), for example, the necessity for locking the portable terminal 300" can be different. In the case shown in FIG. 18, the third party who operates the portable terminal 300" generates the sampling trigger several times unconsciously on the menu screen. As described earlier, the sampling trigger in the menu mode is "menu screen being displayed ∩ pressing OK key". Gripping feature samples acquired at that time are used to perform authentication. Every time authentication fails, the score β is added to the other-person score (Oth). The threshold Th7 for the menu mode is 60, the other-person score does not exceed Th7 in the menu mode, and the menu screen is changed to the address book screen. Also in this address book screen, the third party generates the sampling trigger several times unconsciously. Therefore, every time authentication fails, the score β is added to the other-person score (Oth). The threshold Th4 for the personal information browsing mode (mode 4) is as low as 40. Also in this mode, the other-person score (Oth) does not exceed Th4, and the address book screen is changed to the making calls screen. As described earlier, the sampling trigger in the making calls mode (mode 5) is generated once every five minutes. Therefore, gripping feature samples are automatically acquired once every five minutes while the third party is making a call. Therefore, every time authentication fails, the score β is added to the other-person score (Oth). The other-person score (Oth) accumulated in the menu mode, in the personal information browsing mode, and in the making calls mode exceeds the threshold (Th5=50) for the making calls mode, and the portable terminal 300" is locked at that time.

When the terminal is locked, all the functions of the terminal may be locked, or only the mode in which the other-person score exceeded the threshold may be locked. In the case shown in FIG. 18, the other-person score (Oth) exceeds 50. Since the other-person score (Oth) exceeds the threshold (other-person determination line) in each of the browser 1 mode, the browser 2 mode, the email mode, the personal information browsing mode, and the making calls mode, only the browser function, the email function, the personal information browsing function, and making calls function may be locked. As described above, since the threshold for locking the terminal can be lowered by using the accumulated other-person score to lock the terminal, even if the user operates the portable terminal 300" with a gripping state accidentally different from the usual gripping state, the portable terminal 300" is not immediately locked, improving the convenience for the user. In addition, the threshold (other-person determination line) can be made different in different modes, so that different operations are provided in a mode in which the terminal should be locked immediately against the operation of a malicious third party and in a mode in which such locking is not necessary. A plurality of modes having the same threshold may be used. Since the operation of the portable terminal 300" in the present embodiment in the learning state is exactly the same as that of the portable terminal 300' in the second embodiment, a description thereof is omitted.

Fourth Embodiment

Figure 7:
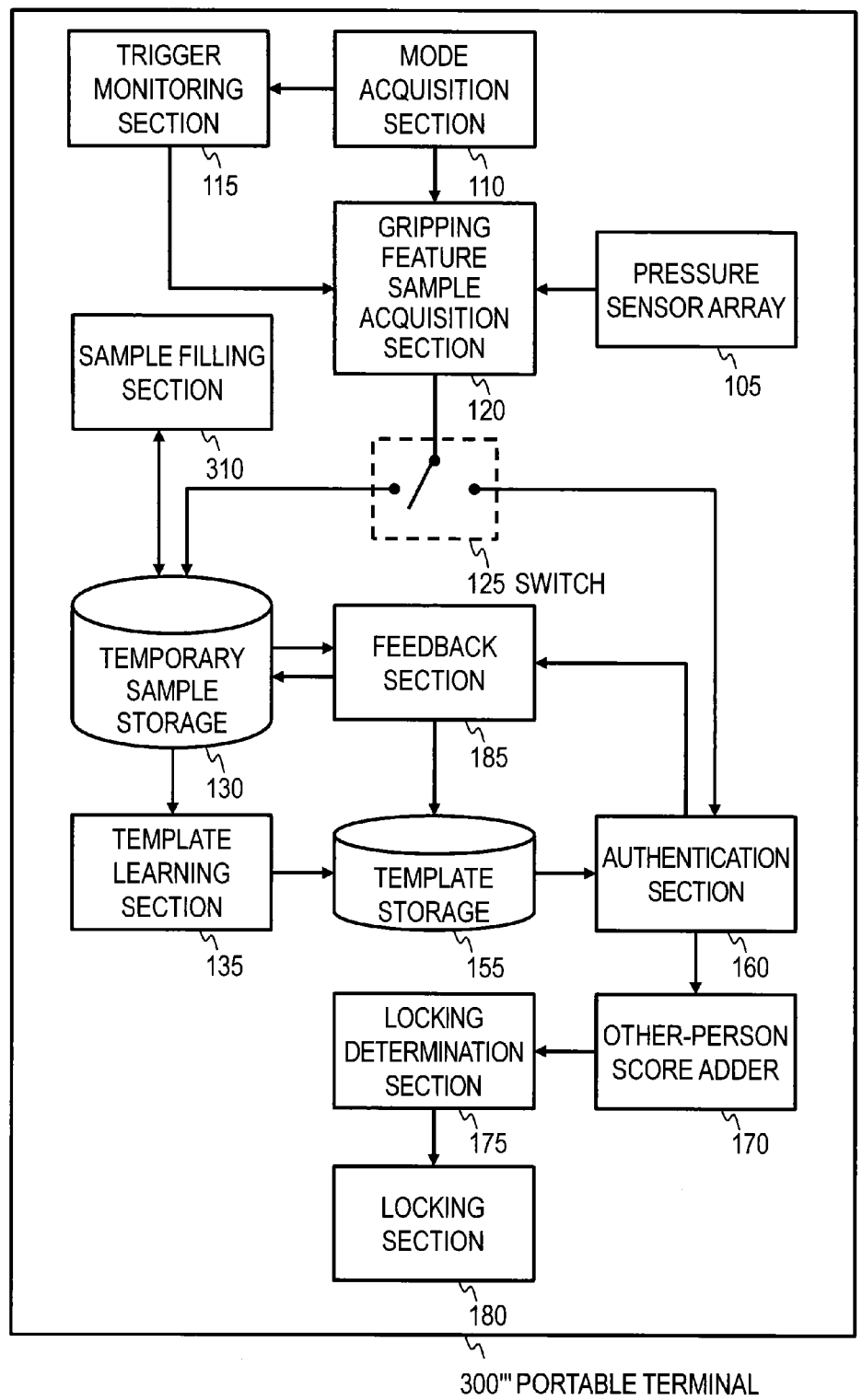
FIG. 7 is a block diagram showing the structure of a portable terminal according to a fourth embodiment.
Figure 13:
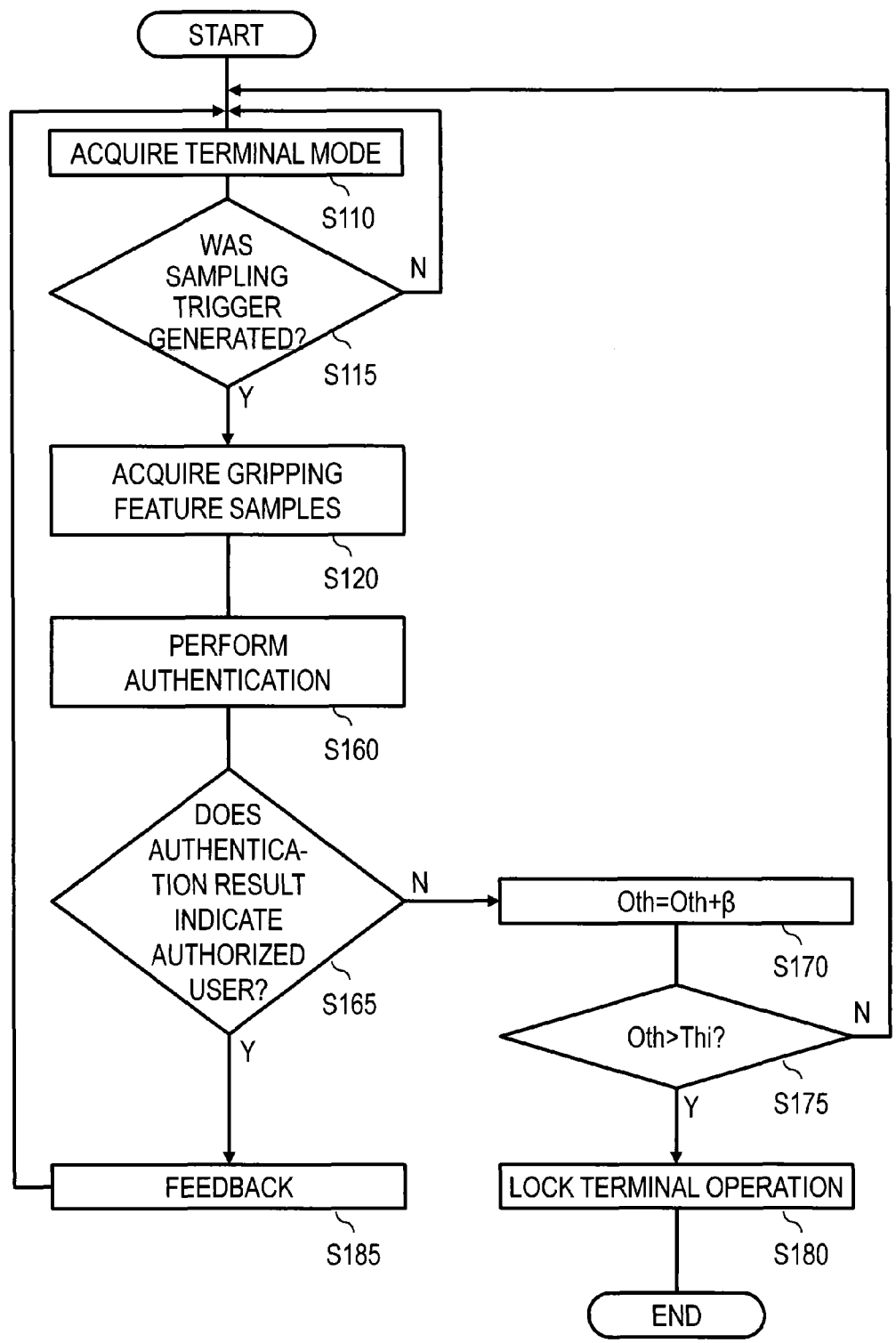
FIG. 13 is a flowchart showing the operation of the portable terminal according to the fourth embodiment in an authentication state.

A portable terminal 300''' according to a fourth embodiment, which is an example terminal in which the authentication function of the portable terminal 300" according to the third embodiment, described above, has been further improved, will be described in detail with reference to FIG. 7 and FIG. 13. FIG. 7 is a block diagram showing the structure of the portable terminal 300'''. FIG. 13 is a flowchart showing the operation of the portable terminal 300''' in an authentication state. As shown in FIG. 7, the portable terminal 300''' is made by adding a feedback section 185 to the configuration of the portable terminal 300" shown in FIG. 6. Since the operation of each section other than the feedback section 185 is exactly the same as that of the section having the same reference numeral in the third embodiment, a description thereof is omitted. In the third embodiment, when the authentication by the authentication section 160 succeeds in step S165 in FIG. 12, the processing just returns to the start. In the present embodiment, when the authentication by the authentication section 160 succeeds in step S165 in FIG. 13, the gripping feature samples used to learn the authentication template and the gripping feature samples used to perform the authentication are used to correct the authentication template by feedback (S185). More specifically, when the authentication by the authentication section 160 succeeds (Yes in step S165), the gripping feature samples used in the authentication are stored temporarily in the feedback section 185. Then, the feedback section 185 acquires all the gripping feature samples used to generate the authentication template from the temporary sample storage 130. The feedback section 185 uses the gripping feature samples used to perform the authentication and all the gripping feature samples used to generate the authentication template to newly generate an authentication template (feedback correction). The new authentication template generated in this way is stored in the template storage 155 (S185). The gripping feature samples used to perform the authentication are stored in the temporary sample storage 130 for the next feedback correction. As described above, the gripping feature samples used when authentication succeeds are used for feedback correction to generate a more precise authentication template.

In the feedback correction, the gripping feature samples used to fill in the lacking samples may be replaced with gripping feature samples newly acquired when authentication is performed. More specifically, when the authentication by the authentication section 160 succeeds (Yes in step S165), the gripping feature samples used in the authentication are stored temporarily in the feedback section 185. Then, the feedback section 185 acquires all the gripping feature samples used to generate the authentication template from the temporary sample storage 130. If the acquired gripping feature samples include gripping feature samples filled in from another mode, the filled-in gripping feature samples are replaced with gripping feature samples newly acquired to generate a new authentication template (feedback correction). The new authentication template generated in this way is stored in the template storage 155 (S185). The gripping feature samples used to perform the authentication and also used for the replacement are substituted for the filled-in gripping feature samples and stored in the temporary sample storage 130 for the next feedback correction. As described above, the filled-in gripping feature samples are replaced with the new gripping feature samples by feedback correction to further improve the precision of the authentication template. Since learning data can be added, if necessary, by such feedback correction, authentication by gripping features can be started early by shortening the initial learning period and calling it a short learning mode or a temporary learning mode, learning the authentication template even after the learning period in the short learning mode or the temporary learning mode elapses, and improving the precision of the obtained authentication template step-by-step by feedback correction.

Since the operation of the portable terminal 300''' in the present embodiment in the learning state is exactly the same as that of the portable terminal 300' in the second embodiment, a description thereof is omitted.

In the foregoing descriptions of the embodiments, the first embodiment was used as a basic pattern; the second embodiment was made by adding the trigger monitoring section 115 thereto; the third embodiment was made by adding the other-person score adder 170 and the locking determination section 175 to the second embodiment; and the fourth embodiment was made by adding the feedback section 185 to the third embodiment, but the combination is not limited to those described above. It is possible to add only the other-person score adder 170 and the locking determination section 175 to the first embodiment. It is possible to add only the feedback section 185 to the first embodiment. It is possible to add only the other-person score adder 170, the locking determination section 175, and the feedback section 185 to the first embodiment. It is possible to add only the feedback section 185 to the second embodiment.

Each type of processing described above may be executed not only time sequentially according to the order in the description but also in parallel or individually when necessary or according to the processing capability of each apparatus that executes the processing. Appropriate changes can be made to the present invention without departing from the scope of the present invention.

When the configurations described above are implemented by a computer, the processing details of the functions that should be provided by each apparatus are described in a program. When the program is executed by the computer, the processing functions are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

The program is distributed by selling, transferring, or lending a portable recording medium, such as a DVD or a CD-ROM, with the program recorded on it, for example. The program may also be distributed by storing the program in a storage unit of a server computer and transferring the program from the server computer to another computer through a network.

A computer that executes this type of program first stores the program recorded on a portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, each apparatus is implemented by executing the predetermined program on the computer, but at least a part of the processing may be implemented by hardware.

What is claimed is:

1. A mobile information terminal that acquires gripping feature samples when being gripped and that performs authentication, the terminal comprising:
   a mode acquisition section adapted to acquire the mode of the mobile information terminal;
   a gripping-feature sample acquisition section adapted to acquire the gripping feature samples;
   a switch adapted to switch the mobile information terminal between a learning state and an authentication state;
   a sample filling section adapted to, when the mobile information terminal is in the learning state of an authentication template and the number of gripping feature samples acquired in a first mode is insufficient, filling the lacking gripping feature samples in the first mode with gripping feature samples acquired in a second mode different from the first mode using a transition source occupation rate R which is proportion of t to T, where t indicates a number of events in which a user transitions from the second mode to the first mode, and T indicates a number of events in which the user transitions from any mode to the first mode;
   a template learning section adapted to learn an authentication template in each mode by using the gripping feature samples acquired by the gripping-feature sample acquisition section, when the mobile information terminal is in the learning state;
   an authentication section adapted to compare gripping feature samples acquired when the mobile information terminal is in the authentication state, with the learned authentication template to perform the authentication; and
   a locking section adapted to lock some or all of the functions of the mobile information terminal when the authentication fails.

2. The mobile information terminal according to claim 1, further comprising:
   a trigger monitoring section adapted to output a gripping-feature acquisition signal when a sampling trigger determined depending on the mode is generated,
   wherein the gripping-feature sample acquisition section receives the gripping-feature acquisition signal and acquires the gripping feature samples.

3. The mobile information terminal according to claim 1, further comprising:
   an other-person score adder adapted to add a predetermined score to an other-person score when the mobile information terminal is in the authentication state and the result of the authentication performed by the authentication section indicates an unauthorized user of the mobile information terminal; and
   a locking determination section adapted to determine that the authentication fails when the other-person score exceeds a predetermined threshold.

4. The mobile information terminal according to claim 1, further comprising:
   a feedback section adapted to, when the mobile information terminal is in the authentication state and the result of the authentication performed by the authentication section indicates the authorized user of the mobile information terminal, use the gripping feature samples used to learn the authentication template and gripping feature samples used in the authentication to apply feedback correction to the authentication template.

5. A gripping-feature learning method for acquiring gripping feature samples when a mobile information terminal is gripped and for learning an authentication template, the gripping-feature learning method comprising:
   a mode acquisition step of acquiring the mode of the mobile information terminal;
   a gripping-feature sample acquisition step of acquiring the gripping feature samples;
   a sample filling step of, when the number of gripping feature samples acquired in a first mode is insufficient, filling in the lacking gripping feature samples in the first mode with gripping feature samples acquired in a second mode different from the first mode using a transition source occupation rate R which is proportion of t to T, where t indicates a number of events in which a user transitions from the second mode to the first mode, and T indicates a number of events in which the user transitions from any mode to the first mode; and a template learning step of learning an authentication template in each mode by using the gripping feature samples acquired in the gripping-feature sample acquisition step.

6. The gripping-feature learning method according to claim 5, further comprising:

a trigger monitoring step of outputting a gripping-feature acquisition signal when a sampling trigger determined depending on the mode is generated, wherein the gripping-feature acquisition signal is received and the gripping feature samples are acquired in the gripping-feature sample acquisition step.

7. The mobile information terminal according to claim 2, further comprising:

an other-person score adder adapted to add a predetermined score to an other-person score when the mobile information terminal is in the authentication state and the result of the authentication performed by the authentication section indicates an unauthorized user of the mobile information terminal; and a locking determination section adapted to determine that the authentication fails when the other-person score exceeds a predetermined threshold.

8. The mobile information terminal according to claim 2, further comprising:

a feedback section adapted to, when the mobile information terminal is in the authentication state and the result of the authentication performed by the authentication section indicates the authorized user of the mobile information terminal, use the gripping feature samples used to learn the authentication template and gripping feature samples used in the authentication to apply feedback correction to the authentication template.

9. The mobile information terminal according to claim 3, further comprising:

a feedback section adapted to, when the mobile information terminal is in the authentication state and the result of the authentication performed by the authentication section indicates the authorized user of the mobile information terminal, use the gripping feature samples used to learn the authentication template and gripping feature samples used in the authentication to apply feedback correction to the authentication template.

10. The mobile information terminal according to claim 7, further comprising:

a feedback section adapted to, when the mobile information terminal is in the authentication state and the result of the authentication performed by the authentication section indicates the authorized user of the mobile information terminal, use the gripping feature samples used to learn the authentication template and gripping feature samples used in the authentication to apply feedback correction to the authentication template.

11. A non-transitory computer-readable recording medium having recorded thereon a program for causing a computer to execute a gripping-feature learning method for acquiring gripping feature samples when a mobile information terminal is gripped and for learning an authentication template, the gripping-feature learning method comprising:

a mode acquisition step of acquiring the mode of the mobile information terminal;

a gripping-feature sample acquisition step of acquiring the gripping feature samples;

a sample filling step of, when the number of gripping feature samples acquired in a first mode is insufficient, filling in the lacking gripping feature samples in the first mode with gripping feature samples acquired in a second mode different from the first mode using a transition source occupation rate R which is proportion of t to T, where t indicates a number of events in which a user transitions from the second mode to the first mode, and T indicates a number of events in which the user transitions from any mode to the first mode; and a template learning step of learning an authentication template in each mode by using the gripping feature samples acquired in the gripping-feature sample acquisition step.

* * * * *